US006178544B1

United States Patent
Syo

(10) Patent No.: US 6,178,544 B1
(45) Date of Patent: Jan. 23, 2001

(54) SIMULATION MESH GENERATION METHOD, APPARATUS, AND PROGRAM PRODUCT

(75) Inventor: Toshiyuki Syo, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/121,913

(22) Filed: Jul. 24, 1998

(30) Foreign Application Priority Data

Jul. 24, 1997 (JP) .................................................... 9-198640

(51) Int. Cl.[7] ............................ G06F 17/50; G05B 17/00
(52) U.S. Cl. ................................................ 716/20; 703/14
(58) Field of Search ............................. 703/2, 6, 13, 14; 716/20

(56) References Cited

U.S. PATENT DOCUMENTS

| | | | |
|---|---|---|---|
| 5,125,038 | 6/1992 | Meshkat et al. | 382/154 |
| 5,553,206 | 9/1996 | Meshkat | 345/423 |
| 5,602,979 | 2/1997 | Loop | 345/423 |
| 5,677,846 | 10/1997 | Kumashiro | 716/20 |
| 5,684,723 | * 11/1997 | Nakadai | 716/20 |

FOREIGN PATENT DOCUMENTS

| | | |
|---|---|---|
| 0 644 497 A2 | 3/1995 | (EP) . |
| 0 798 667 A2 | 10/1997 | (EP) . |

(List continued on next page.)

OTHER PUBLICATIONS

Syo T. et al.: "A Triangular mesh with the interface protection layer suitable for the diffusion simulation" 1996 International Conference on Simulation of Semiconductor Processes and Devices, SISPAD '96 (IEEE CAT. No. 96[TH]8095), Proceedings of International Conference on Simulation of Semiconductor Processes and Devices, Tokyo, Japan, Sep. 2–4, 1996, Tokyo, Japan, Japan Soc. Appl. Phys. Japan ISBN: 0–7803–2745–4.

(List continued on next page.)

Primary Examiner—Kevin J. Teska
Assistant Examiner—Kyle J. Choi
(74) Attorney, Agent, or Firm—Sughrue, Mion, Zinn Macpeak & Seas, PLLC

(57) ABSTRACT

A method, computer system, and a computer readable medium is disclosed for generating triangular meshes for the purpose of performing high-speed generation of triangular meshes with boundary protection layers. One use for the invention is in simulations such as for semiconductor process and device simulations. The invention provides a way to suppress the volume of triangular meshes generated, by limiting the domains that destroy the boundary protection layer, thus, improving the speed of shape analysis. First, shape data is received and then, the next step is defining a boundary protection layer comprising orthogonal meshes matched locally with boundary line segments. After that, mesh points are placed inside domains separated by at least a reference distance from the boundary protection layer. Next, destructive domains are defined as those domains wherein there is a possibility of boundary protection layer destruction, and the mesh points that are inside the destructive domains are joined to create triangular meshes. A determination of the presence or absence of any such triangular meshes destructive of the boundary protection layer is made. When triangular meshes exist that are destructive of the boundary protection layer, the mesh point inside the destructive domains is projected onto the boundary line segments, and is added as a mesh point on a newly created boundary. Finally, unjoined mesh points are joined when triangular meshes no longer exist that are destructive of the boundary protection layer, and the triangular mesh data is output.

26 Claims, 17 Drawing Sheets

FOREIGN PATENT DOCUMENTS

| | | |
|---|---|---|
| 7-161962 | 6/1985 | (JP) . |
| 7-161962 | 6/1995 | (JP) . |
| 7-219977 | 8/1995 | (JP) . |
| 8-329284 | 12/1996 | (JP) . |
| 9-266299 | 10/1997 | (JP) . |

OTHER PUBLICATIONS

S. Kumashiro et al., "A Triangular Mesh Generation Method Suitable for the Analysis of Comples MOS Devices Structures", NUPAD–V, 1994, pp. 167–170.

Tsuboi, H. et al., "Triangular Mesh Generation Using Knowledge Base for Three–Dimensional Boundary Element Method," IEEE Transaction on Magnetics, vol. 26, No. 2, Mar. 1990, pp. 799–802.*

Ahn, C. et al., "A Self–Orginizing Neural Network Approach for Automatic Mesh Generation," IEEE Transaction on Magnetics, vol. 27, No. 5, Sep. 1991, pp. 4201–4204.*

Miao, Y. et al., "Advanced Two Dimensional Automatic Triangular Mesh Generation for DE2D Interactive Software Package," IEEE Transaction on Magnetics, vol. 24, No. 1, Han 1988, pp. 318–321.*

Srinivasan, V. et al., "Automatic Mesh Generation Using the Symmetric Axis Transformation of Polygonal Domains," Proceedings of IEEE, vol. 80, No. 9, Sep. 1992, pp. 1485–1501.*

* cited by examiner

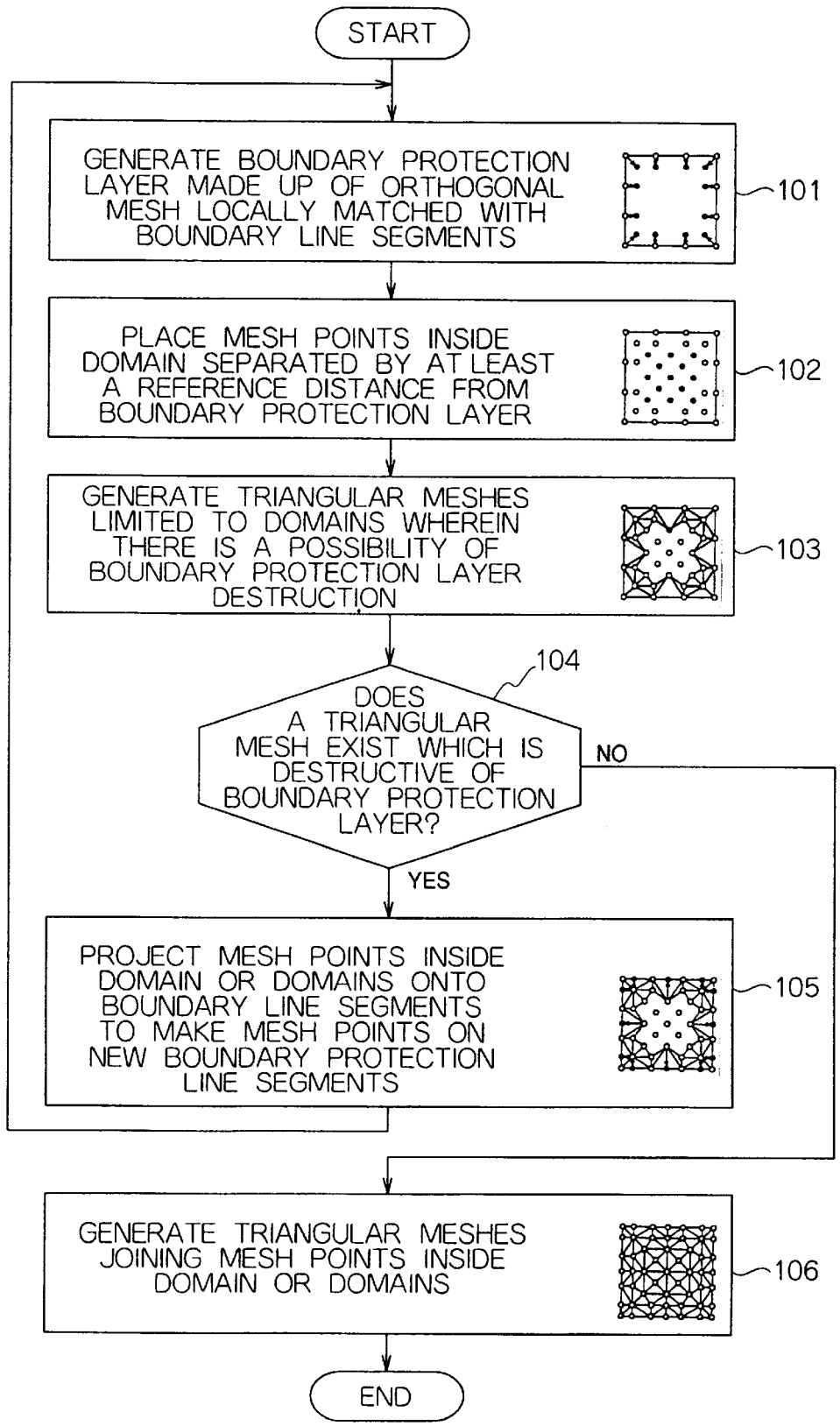

FIG. 4
- ● MESH POINT ON BOUNDARY
- ○ MESH POINT ON FIRST BOUNDARY PROTECTION LAYER
- ■ MESH POINT ON SECOND BOUNDARY PROTECTION LAYER
- □ MESH POINT INSIDE DOMAIN
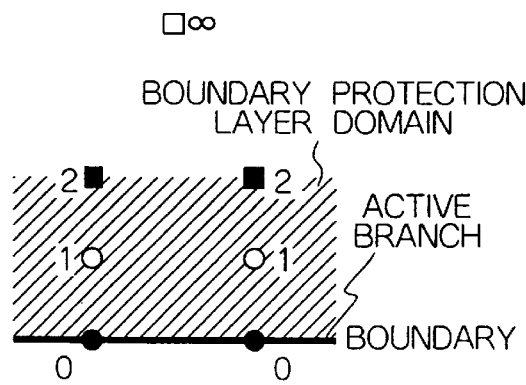
(1) INITIAL STATE
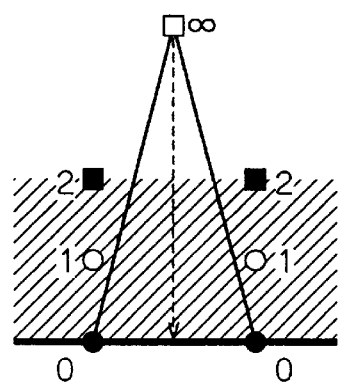
(2) DESTRUCTION 1
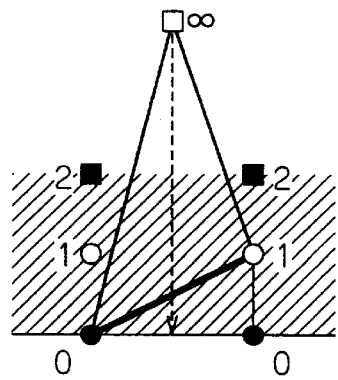
(3) DESTRUCTION 2
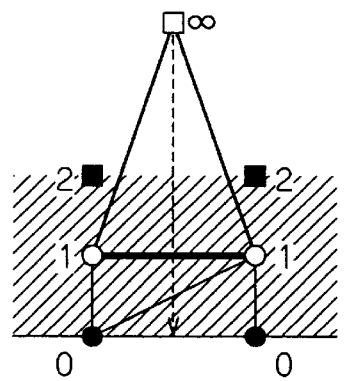
(4) DESTRUCTION 3
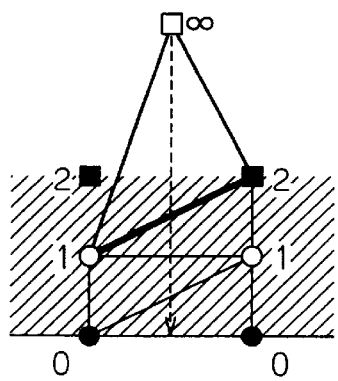
(5) DESTRUCTION 4
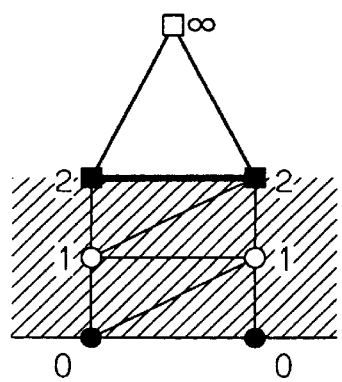
(6) NO PROBLEM

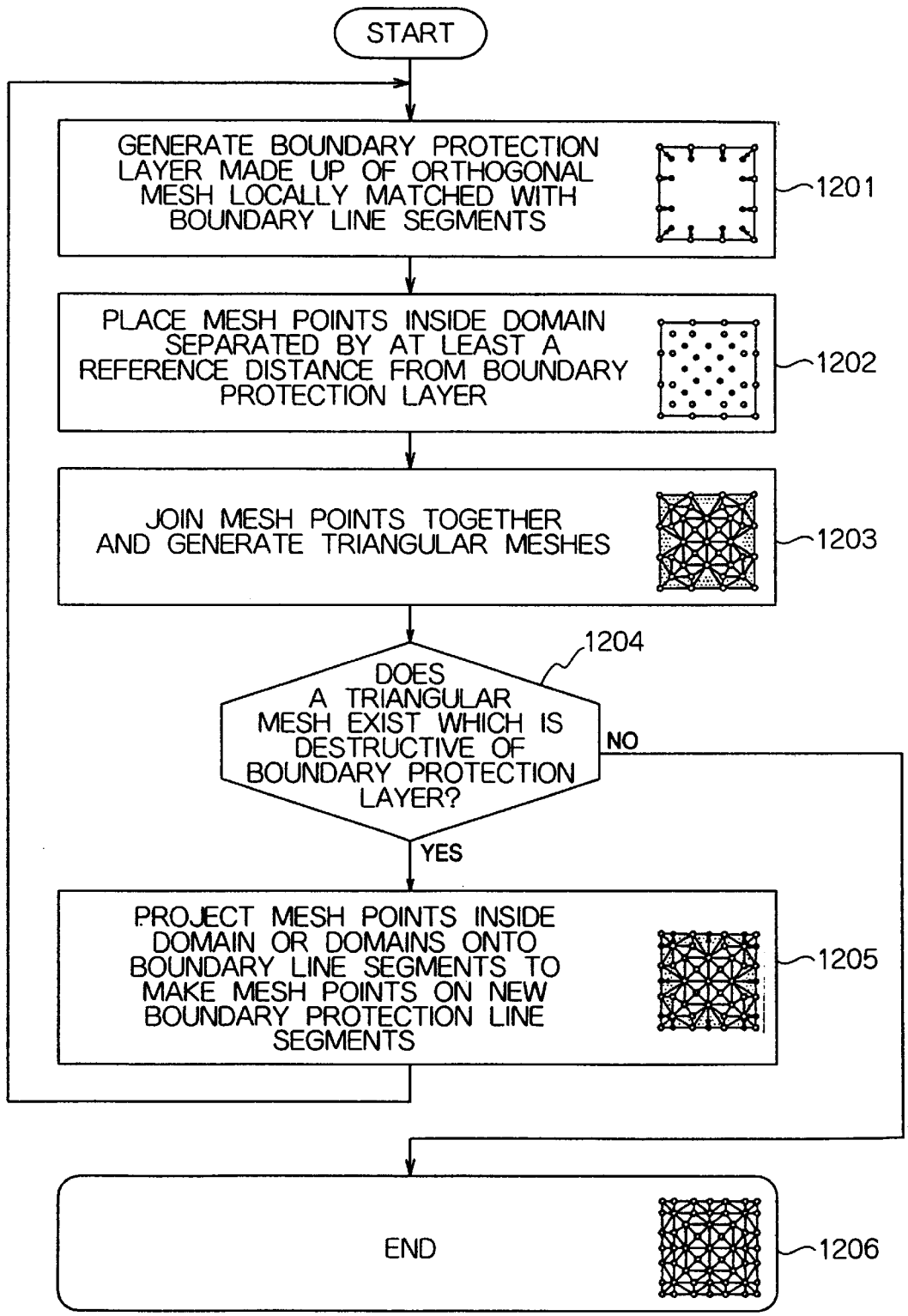

SIMULATION MESH GENERATION METHOD, APPARATUS, AND PROGRAM PRODUCT

BACKGROUND OF THE INVENTION

1. Field of the Invention

This invention concerns a simulation mesh generation method for generating, at high speed, meshes having a boundary protection layer for use in semiconductor processes and device simulations. The present invention also concerns an apparatus for generating these meshes and a computer program product for causing a computer to generate meshes.

2. Description of the Related Art

In semiconductor manufacturing processes using process simulators and in analyzing the electrical properties of transistors using device simulators, it is necessary to solve diffusion continuity equations, Poisson equations, and other partial differential equations in order to determine impurity distributions, current densities, and other physical quantities. Because partial differential equations cannot be solved analytically, however, computations are performed after subdividing analysis domains into small domains and discretizing the partial differential equations. The method of such discretization widely and generally used is mesh generation using triangular meshes, a method that affords outstanding shape compatibility. With this method it is possible to accurately represent the complex shapes found in semiconductors.

When such triangular.meshes are used for MOSFET simulations, however, there are problems, as demonstrated by Kumashiro and Yokota in "NUPAD-V," pp. 167–170. It has also been demonstrated that the boundary protection layer disclosed in Unexamined Japanese Patent Publication No. A-7-161962 [1995] is an effective measure for resolving these problems.

A technique for generating this boundary protection layer is represented in the flowchart given in FIG. 14. The processing procedures are as follows. In processing step 1201, a boundary protection layer is generated that comprises an orthogonal mesh that is locally matched with the boundary line segments. In processing step 1202, mesh points are placed inside an area separated at least by some reference distance from the boundary protection layer. In processing step 1203, the mesh points are connected together, and a triangular mesh is generated by the method of maximizing the apparent angle. The method of maximizing the apparent angle, as disclosed in Unexamined Japanese Patent Publication No. A-7-219977 [1996], is a method wherein attention branch terminal mesh points and branch vicinity mesh points are connected, and mesh points are thereupon selected wherewith the apparent angle is maximized.

The method of maximizing the apparent angle is now briefly described with reference to FIG. 15. Taking the line segment A14–B14 as an attention branch, in a case where the connectable mesh points are C14, D14, E14, and F14, these respective mesh points are connected with the branch terminal mesh points A14 and B14, and the mesh point wherewith the apparent angle is maximized is selected. By apparent angle is meant, for example, ∠ A14 C14 B14. In the example diagram given in this figure, the apparent angle is maximized when A14 and B14 are connected to mesh point C14. Because the chord A14 B14 is common, the apparent angle reaches maximum at the mesh point where the radius of the circumscribed circle is maximum. When the circumscribed circle radius reaches minimum, there will be no other mesh point contained inside the triangle A14 B14 C14. For this reason, Delaunay division can be performed efficiently with the method of maximizing the apparent angle. It is also possible to generate a triangular mesh that spirals in toward the interior of a domain from the periphery.

Next, in processing step 1204, a search is made for a triangular mesh that destroys the boundary protection layer. When a triangular mesh exists which destroys the boundary protection layer, in processing step 1205, of the apexes of the triangular mesh that destroys the boundary protection layer, the mesh point inside the domain is projected onto the boundary line segment, and that projection point is added as a new mesh point. Thereupon, processing step 1201 is returned to, and the routines from that step on are repeatedly executed until the generation of new projection points ceases. In processing step 1204, moreover, if no triangular mesh exists that destroys the boundary protection layer, all processing for generating the boundary protection layer terminates.

By using the technique described in the foregoing, it is possible to make the cross-sectional area in the normal direction relative to the control volume boundary constant. When that is done, it is possible to accurately compute inversion layer currents for MOSFETs having Si—$SiO_2$ boundary surfaces facing in any direction without producing mesh-induced parasitic resistance.

When this technique is used, however, in cases where a triangular mesh exists which destroys the boundary protection layer, the triangular mesh produced in processing step 1203 will be thrown out. In general, when mesh points become numerous, more time is required to generate triangular meshes, so that, when triangular meshes exist that destroy the boundary protection layer and there are many mesh points, time is lost. For this reason, there is still room for improvement in the high-speed generation of meshes having boundary protection layers in cases where there are triangular meshes that destroy the boundary protection layer.

More specifically, in the prior art described above, there are the following problems.

A first problem is that, while triangular meshes exist that destroy the boundary protection layer, time is wasted in generating triangular meshes that cannot destroy the boundary protection layer, as with triangular meshes inside the domain.

A second problem is that boundary protection layers are also added to the surfaces of device walls or device bottoms wherein reflection type boundary conditions are established, whereupon time is wasted in subsequent process diffusion simulations, etc., because of the boundary protection layer generation time and the increase in the number of meshes.

The present inventor determined by analysis that the cause of these difficulties lies in the fact that the search for triangular meshes destructive of the boundary protection layer is conducted after the triangular meshes have been completed inside the domain. In the prior art, moreover, boundary protection layers are generated for all boundary surfaces, so that boundary protection layers are added also to device wall and bottom surfaces.

SUMMARY OF THE INVENTION

An object of the present invention is to provide a method, apparatus, and program product for producing improved triangular meshes wherewith triangular meshes having boundary protection layers can be generated at high speed.

Another object of the present invention is to provide a method, apparatus, and product wherewith the number of generated meshes that are cancelled can be reduced, and post-processing diffusion simulations, etc., can be speeded up.

A further object of the present invention is to provide a method, apparatus, and product wherewith analyses using triangular meshes can be performed at high speed as compared to the processes for solving diffusion equations.

Therefore, in the present invention, triangular meshes are generated by the following procedure.

a. Device shape data are received;

b. mesh points that define a boundary protection layer having orthogonal meshes matched locally with boundary line segments are generated as boundary protection points;

c. mesh points are placed inside domains separated by at least a reference distance from the boundary protection layer;

d. from among the domains defined by the plurality of mesh points, those domains capable of destroying the boundary protection layer are specified, and, at the same time, the mesh points inside those domains are connected;

e. the presence or absence of triangular meshes destructive of the boundary protection layer is determined by having, in a side or sides, branches wherein the boundary protection points and other mesh points are connected;

f. when there exist triangular meshes destructive of said boundary protection layer, projecting mesh point inside said triangular mesh domains onto said boundary line segments, and adding the projection point as mesh point on new boundary;

g. in cases where no triangular meshes exist that destroy the boundary protection layer, the unconnected mesh points are connected; and h. triangular mesh data are output wherein all of the mesh points are connected.

Thus, in the present invention, in order to prevent the problem of the processing time becoming long due to the generation of needless triangular meshes, triangular meshes are generated beforehand in domains where there is no possibility of destroying the boundary protection layer. In a preferred embodiment, domains that are defined by boundary protection points inside the boundary protection layer and mesh points placed one level further inside from those boundary protection points are identified as domains capable of destroying the boundary protection layer. In another example, only triangular meshes containing at least one boundary protection point are generated by Delaunay division. When that is done, first of all, triangular meshes are generated such that the boundary protection points are enclosed, and no triangular meshes are generated which do not contain a boundary protection point. Thereupon, all triangular meshes capable of destroying the boundary protection layer are generated. Then, after generating these triangular meshes capable of destroying the boundary protection layer, for those triangular meshes therein which actually do destroy the boundary protection layer, a point is projected onto the boundary line segments from the mesh points inside the triangular mesh domains, and, at the same time, those projection points are added as new boundary mesh points. Thereupon, when boundary protection points are again generated, the triangular meshes that destroy the boundary protection layer disappear.

In other words, in the present invention, the volume of triangular meshes generated is suppressed by limiting the domains that destroy the boundary protection layer, and shape analysis processing is speeded up.

When triangular meshes that destroy the boundary protection layer are being searched for, rather than completing the triangular meshes inside the domains, the domains destructive of the boundary protection layer are limited, and the number of triangular mesh generations thereby reduced, making it possible to shorten the time required to generate the triangular meshes. Furthermore, by reducing the number of meshes by limiting the domains added to the boundary protection layer, it is also possible to shorten the computation time for post-processing diffusion simulations.

BRIEF DESCRIPTION OF THE DRAWINGS

FIG. 4 is an explanatory drawing that diagrams meshes that destroy the boundary protection layer in the first embodiment, representing the initial state at (1), destruction at (2) to (5), and no problem at (6), respectively;

FIG. 14 is a flowchart for a case where a boundary protection layer is generated with the prior art;

FIG. 15 is an explanatory diagram for a triangular mesh generation method based on the method of maximizing the apparent angle;

DESCRIPTION OF THE PREFERRED EMBODIMENTS

A number of preferred embodiments of the present invention are now described, making reference to the drawings.

EMBODIMENT 1

Figure 1:
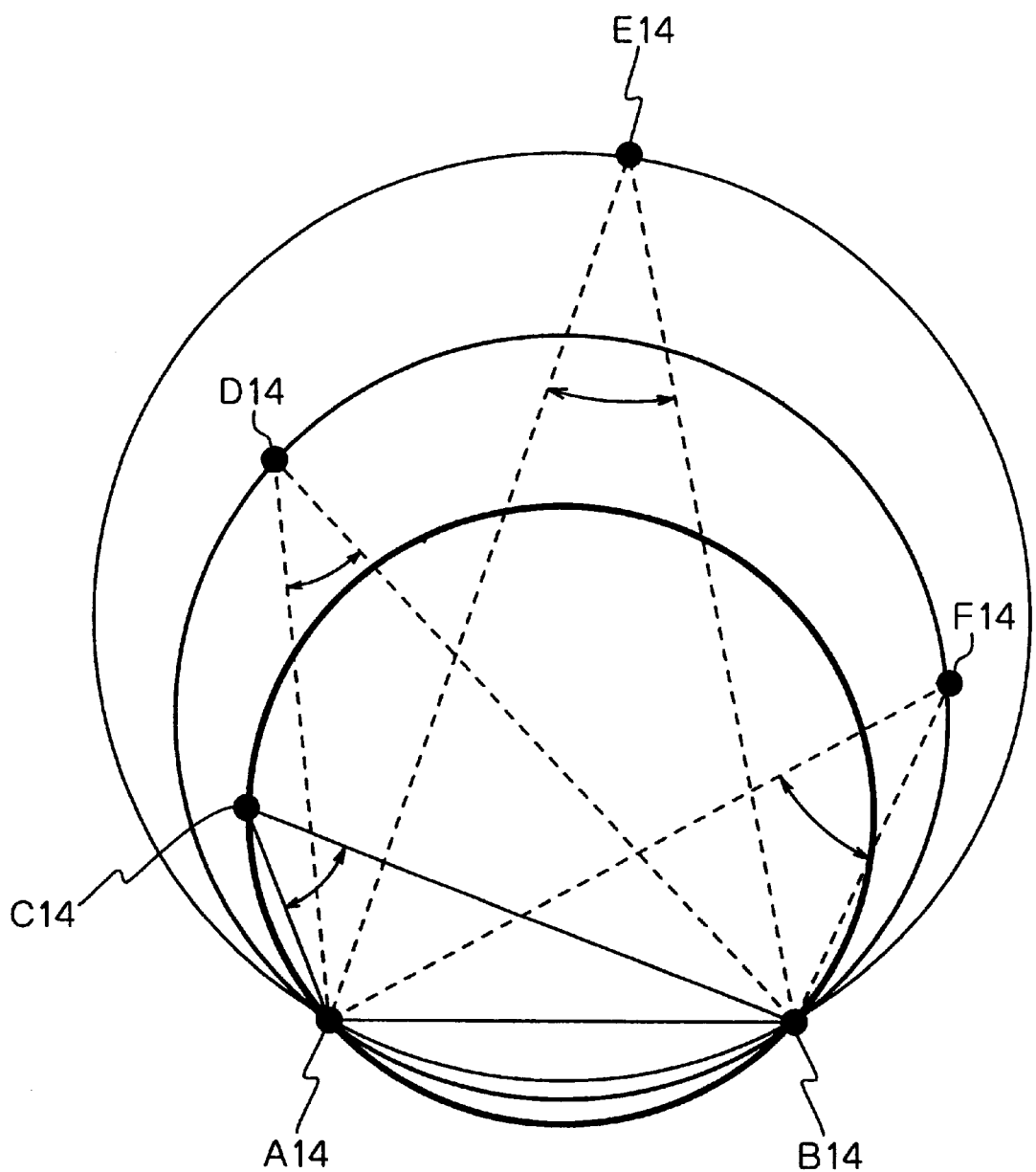
FIG. 1 is a flowchart for generating a boundary protection layer that represents a first embodiment of the present invention.

A flowchart for first embodiment is given in FIG. 1.

First, in processing step 101, a boundary protection layer made up of orthogonal meshes locally matched with the boundary line segments is generated. Next, in processing step 102, mesh points are placed within domains separated by at least a reference distance from the generated boundary protection layer. By reference distance here is meant a distance $r_{normal}$ at which the points inside the domains do not come inside the boundary protection layer.

$$r_{normal} = \text{Numbers} \times d + \epsilon \quad (1)$$

In this equation (1), $r_{normal}$ is the distance from the boundary line segment, Numbers is the number of boundary protection layers, d is the thickness of one boundary protection. layer, and $\epsilon 0$ is the minimum distance of separation from the boundary protection layer.

In the case of sub-domain points, since the triangular meshes destructive of the boundary protection layer cannot be corrected in a subsequent processing step, it is necessary to remove beforehand mesh points existing at positions such that triangular meshes destructive of the boundary protection layer can be formed.

Figure 2:
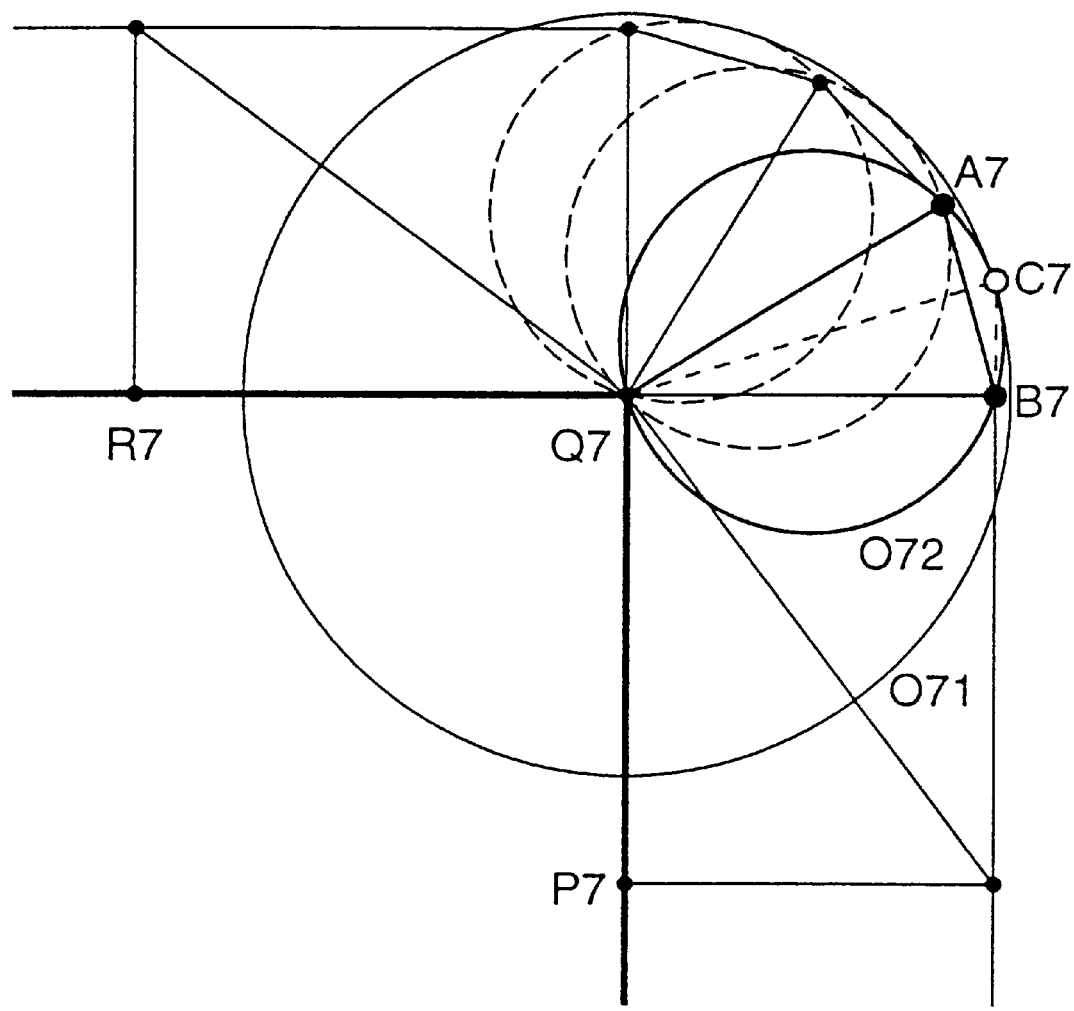
FIG. 2 is an explanatory drawing that diagrams conditions wherein no points exist in a domain that destroy the boundary protection layer when there is one boundary protection layer, at sub-domain points in the first embodiment.

As an example, a case wherein there is one boundary protection layer is diagrammed in FIG. 2, where it is assumed that the line segment P7-Q7-R7 is a boundary line, and that A7 and B7 are boundary protection points generated from the sub-domain point Q7. In this case, if the triangular mesh is the triangle Q7 A7 B7, then it will not destroy the boundary protection layer, but in cases where the mesh point C7 exists in a domain inside the circle O72 circumscribed about the triangle Q7 A7 B7, when triangular mesh production is done using the method of maximizing the apparent angle, C7 is selected, a triangular mesh such as the triangle Q7 C7 B7 is generated, and the boundary protection layer is destroyed.

In order to keep from generating such triangular meshes that destroy the boundary protection layer, it is only necessary to prevent the existence of mesh points inside a domain inside the circle O72 circumscribed about the triangle Q7 A7 B7. By performing the above search in all of the circumscribed circles, it is possible to avoid the generation of triangular meshes destructive of the boundary protection layer, but too much time is required for such searches. In order to speed things up, it is possible to employ determination conditions wherewith, within a radius that contains the circumscribed circle O72, such as O71, no mesh points exist inside the domain, and only boundary protection points exist therein.

Figure 3:
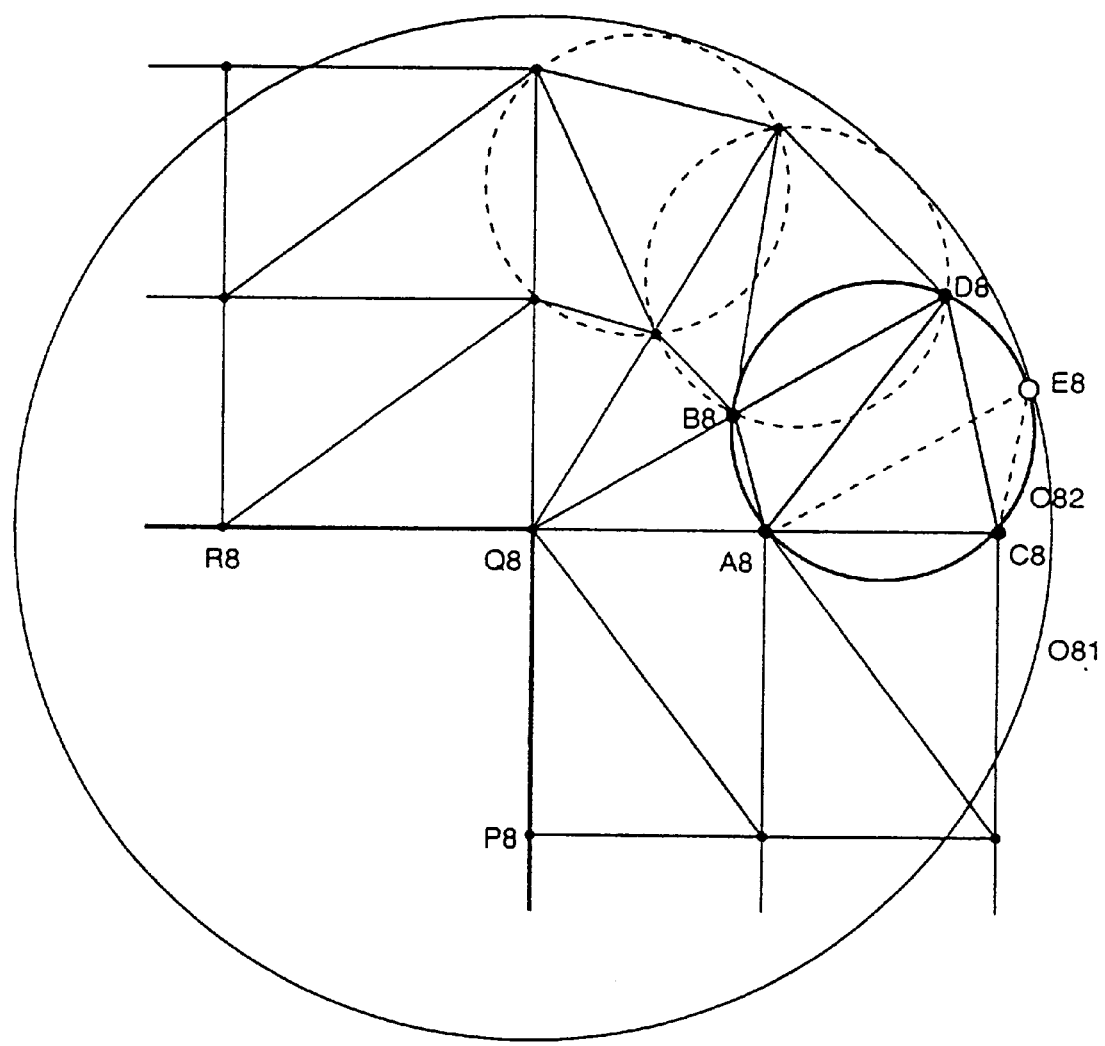
FIG. 3 is an explanatory drawing that diagrams conditions wherein no points exist in a domain that destroy the boundary protection layers when there are two boundary protection layers, at sub-domain points in the first embodiment.

In the case diagrammed in FIG. 3 there are two boundary protection layers. As in the case described above wherein there is but one boundary protection layer, the line segment P8-QB-R8 is a boundary line, and the boundary protection points generated from the sub-domain point Q8 are A8, C8, B8, and D8. The boundary protection points A8, B8, C8, and D8 exist on the circumference of the same circle O82. For that reason, in cases where a mesh point such as E8 exists inside a domain, either on or inside the circle O82, when a triangular mesh is generated using the method of maximizing the apparent angle, a triangular mesh such as the triangle A8 C8 E8 is generated and the boundary protection layers are destroyed. In this case also, as in the case described above with but one boundary protection layer, all that need be done is either to prevent the existence of mesh points inside domains inside the circumscribed circle O82, or, as when there is but one layer, to have it such that only boundary protection points, but no mesh points, exist inside the domain within a radius that includes the circumscribed circle O82, such as O81. The radius $r_{boundary}$ of the circle used in the technique described above may be found by the following equation, for example.

$$r_{boundary} \frac{1}{2} d \left[ \frac{2 \cdot Num - 1}{\cos\frac{\theta}{2}} + \sqrt{1 + \left\{(2 \cdot Num - 1)\tan\frac{\theta}{2}\right\}^2} \right] + \varepsilon \quad (2)$$

The $\theta$ in this equation (2) is the interior angle subtended when the sub-domain point and the boundary protection point adjacent thereto are joined, as seen in ∠ A7 Q7 B7 in FIG. 2. By using equation (2), triangular meshes will cease to be generated that are destructive of the boundary protection layers in the boundary protection points generated from the sub-domain point.

In processing step 103, triangular meshes are generated limited to domains wherewith boundary protection layer destruction is possible.

In processing step 104, a determination is made as to whether or not there exist among the triangular meshes produced in.processing step 103 any which are destructive of the boundary protection layers.

This determination as to whether or not the boundary protection layers are being destroyed is made according as to whether or not there exist any branches that join a mesh point inside a domain and a boundary protection point, in a side of a triangular mesh.

FIG. 4 represents an example of a mesh wherewith a boundary protection layer is destroyed. At (1) in FIG. 4, the state prior to mesh generation is depicted. The number of the layer is placed in memory in each mesh point configuring a boundary protection layer, and that mesh point at one of the two ends of an active branch (the heavy solid line in the figure) having the lowest level number is made the protection layer number. In the interest of simplifying the determination, moreover, a value sufficiently larger than the boundary protection layer number is set in the mesh point or points inside the domain. A mesh is defined as being destructive of the boundary protection layer when the branch layer number is the boundary protection layer number −1, and the selected mesh point layer number is larger than the branch layer number +1. At (2) to (5) in FIG. 4 we see the development of a mesh destructive of the boundary protection layer. When there is an active branch at the outermost surface of the boundary protection layer, as at (6) in FIG. 4, this is outside of the scope of determination, so the mesh will not be determined as mesh. wherewith the boundary protection layer is destroyed.

Processing step 105 is the processing routine for cases where a triangular mesh destructive of the boundary protection layer was found to exist in processing step 104. Therein, a point projected on the boundary from a mesh point inside a domain is registered as a mesh point on a new boundary. Because a mesh point is inserted anew in a boundary, it is necessary to reform the boundary protection layer generated from the mesh points on the boundary. To that end the processing routines are repeated from processing step 101.

Processing step 106 is a processing routine for the case where a mesh point does not exists that needs to be newly projected. Therein, triangular meshes are completed for obtaining the final mesh.

What is different from the prior art is that, when searching for a triangular mesh destructive of the boundary protection layer in a processing step for generating triangular meshes, the domain is limited to that wherewith boundary protection layer destruction is possible, and triangular meshes are generated only in that domain, wherefore the number of triangular meshes generated can be reduced, and processing time shortened.

EMBODIMENT 2

A second embodiment of the present invention is described next, making reference to the drawings. A flowchart for this embodiment is given in FIG. 5. In this embodiment, in processing step 103 in FIG. 1, a technique is set forth for generating triangular meshes limited to domains wherein boundary protection layer destruction is possible.

Figure 6:
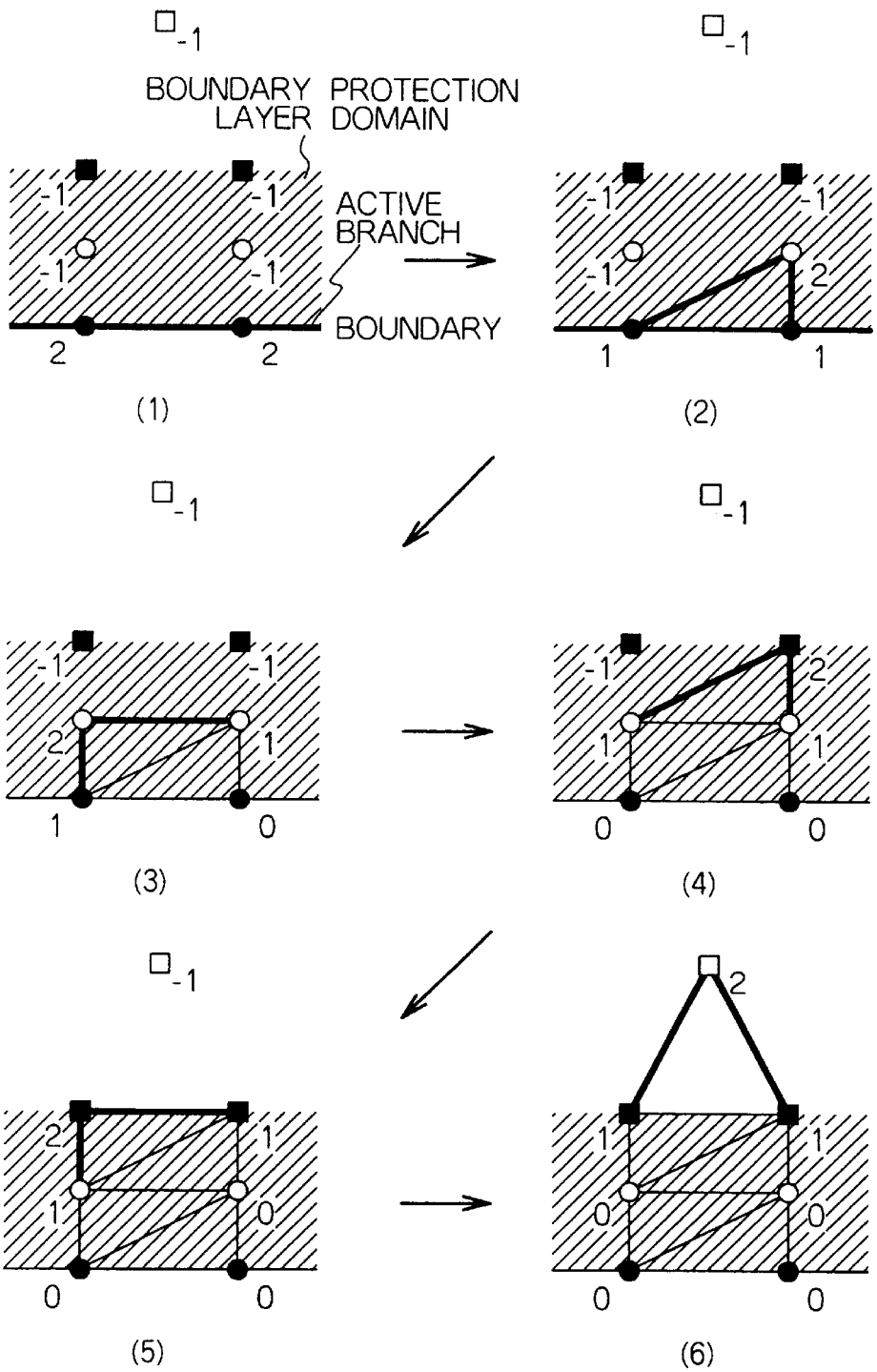
FIG. 6 is an explanatory drawing that diagrams mesh generation using branch activity degrees in the second embodiment.

Processing step 201 is the location constituting the initial position for generating triangular meshes, and a branch between mesh points on a boundary line configuring a boundary line segment is deemed active. FIG. 6 is a diagram for describing the technique for generating meshes using the degree of branch activity. This is the establishment of a start position for producing a triangular mesh in a spiral form that extends inward from the edge of a domain.

At (1) in FIG. 6 is diagrammed the state at the above step. The boundary branch is registered as an active branch, and an active branch counter is set for mesh points on the boundary. For mesh points for which no branch exists, an initial value is set so that it can be determined when the active branch disappeared.

Processing step 202 is the location at which mesh points adjacent to an active branch are connected, using the method of maximizing the apparent angle, and a triangular mesh is produced. At (2) to (6) in FIG. 6, the process of mesh generation is diagrammed. Mesh points are updated. sequentially with the number of active branches, and mesh generation proceeds from the boundary toward the interior of the domain. The triangular mesh generation start position is at the periphery of the domain. Therefore, using the method of maximizing the apparent angle, triangular meshes are generated from the periphery toward the domain interior.

In processing step 203, a determination is made as to whether or not the triangular meshes produced in processing step 202 contain a boundary protection point having a level number that is the boundary protection layer −1. When no boundary protection point is contained, there is no possibility of boundary protection layer destruction, so the object being examined is not registered as a triangular mesh.

Processing steps 204 and 205 are processing routines for cases where a triangular mesh was one existing in a domain destructive of the boundary protection layer. Therein are updated the mesh points used in the triangular mesh or meshes as well as the branch activity degree counter and activity degree.

In processing step 206, the triangular meshes produced in processing step 202 are registered as objects for which determinations are made as to whether or not they are destructive of the boundary protection layer.

In processing step 207, a determination is made as to whether or not a boundary protection point exists at which the activity degree counter is not 0, using the activity degree and the activity degree counter updated in processing steps 204 and 205. The state diagrammed at (6) in FIG. 6 is the state achieved when mesh generation termination conditions prevail, as noted above. Therein, the degree of activity of all mesh points up to the level that is the boundary protection layer number −1 has become 0, and mesh generation is terminated in all domains wherein boundary protection layer destruction is possible.

When a boundary protection point exists for which the activity degree counter is not 0, the processing routines from processing step 202 on are repeated until the activity degree counter for all boundary protection points becomes 0.

EMBODIMENT 3

Figure 5:
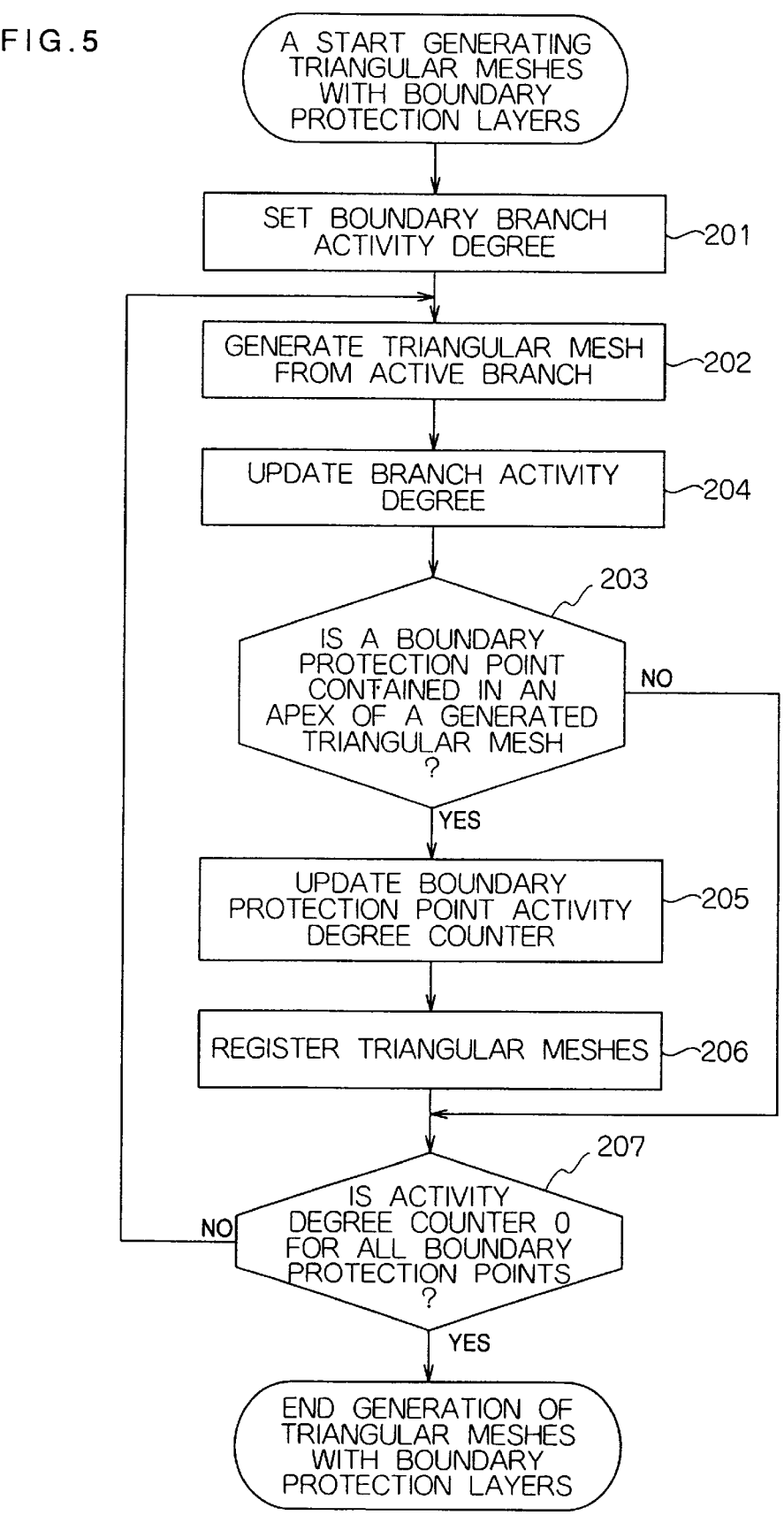
FIG. 5 is a flowchart representing a second embodiment of the present invention, that being a technique for altogether completing triangular meshes inside domains that destroy the boundary protection layer.
Figure 7:
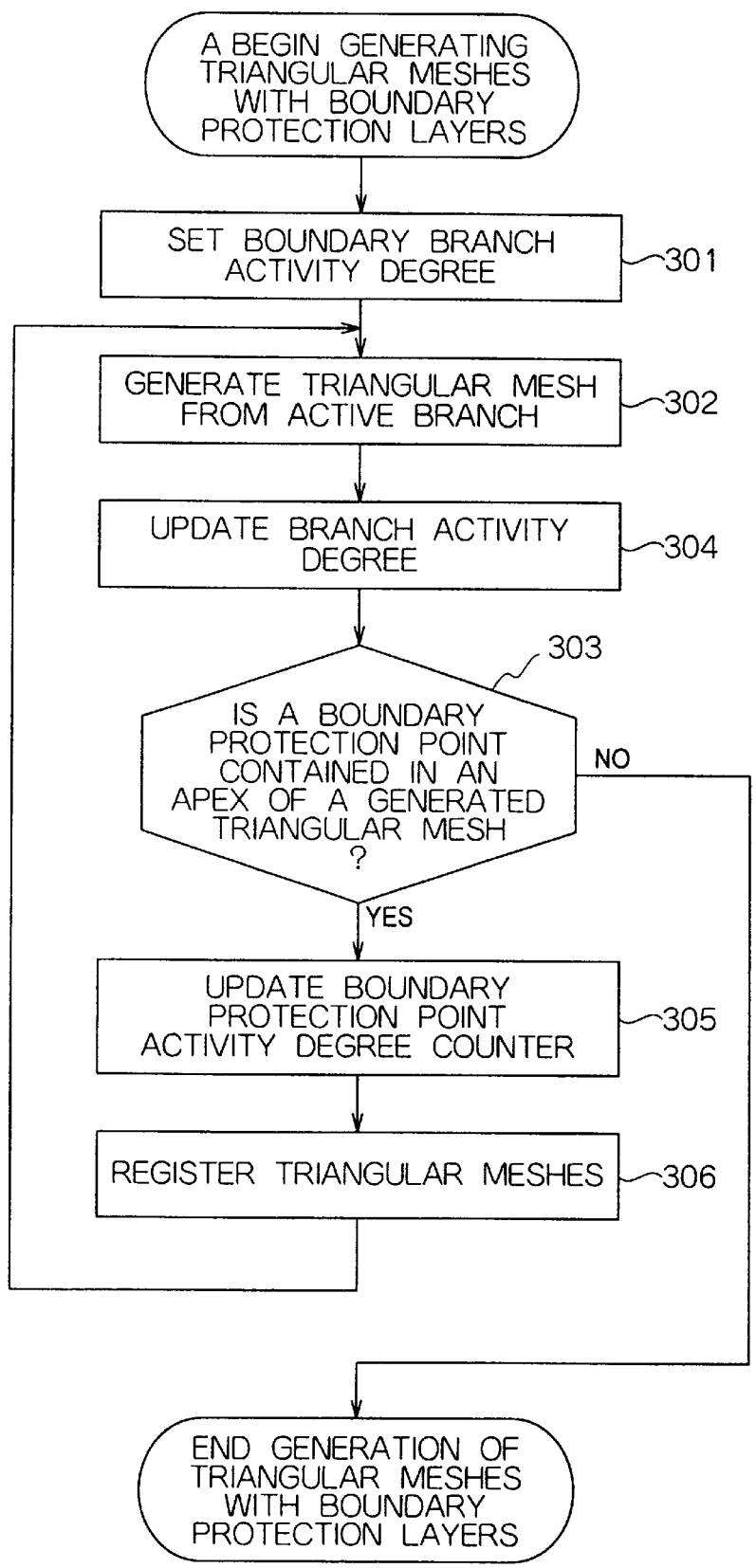
FIG. 7 is a flowchart representing a third embodiment of the present invention, that being a technique for limiting, at high speed, the triangular meshes inside domains that destroy the boundary protection layer.

A third embodiment of the present invention is described next, making reference to the drawings. A flowchart for this embodiment is given in FIG. 7. This embodiment is a technique wherein the technique diagrammed in FIG. 5 is simplified, using the characteristics of mesh points configuring a boundary protection layer. FIG. 7 provides, as does FIG. 5 a detailed flowchart for generating (in processing step 103) triangular meshes only in domains wherein boundary protection layer destruction is possible.

The mesh points that configure the boundary protection layer exist at a constant distance from the boundary. Using this characteristic, triangular meshes are generated, in spiral form, starting from points near the boundary, with their directions determined toward the interior of the domain, whereupon triangular meshes are initially completed using boundary protection points. It is thereby possible to make the mesh generation termination conditions be those in processing step 303 in FIG. 7 rather than those in processing step 207 in FIG. 5. At sub-domain points, however, wedge shapes are sometimes left remaining with no triangular mesh generated. At these sub-domain points, however, this has no effect, because, due to processing step 102 in FIG. 1, boundary protection layer destruction has ceased.

It is possible to speed up mesh generation even further using this simplified determination standard.

Figure 8:
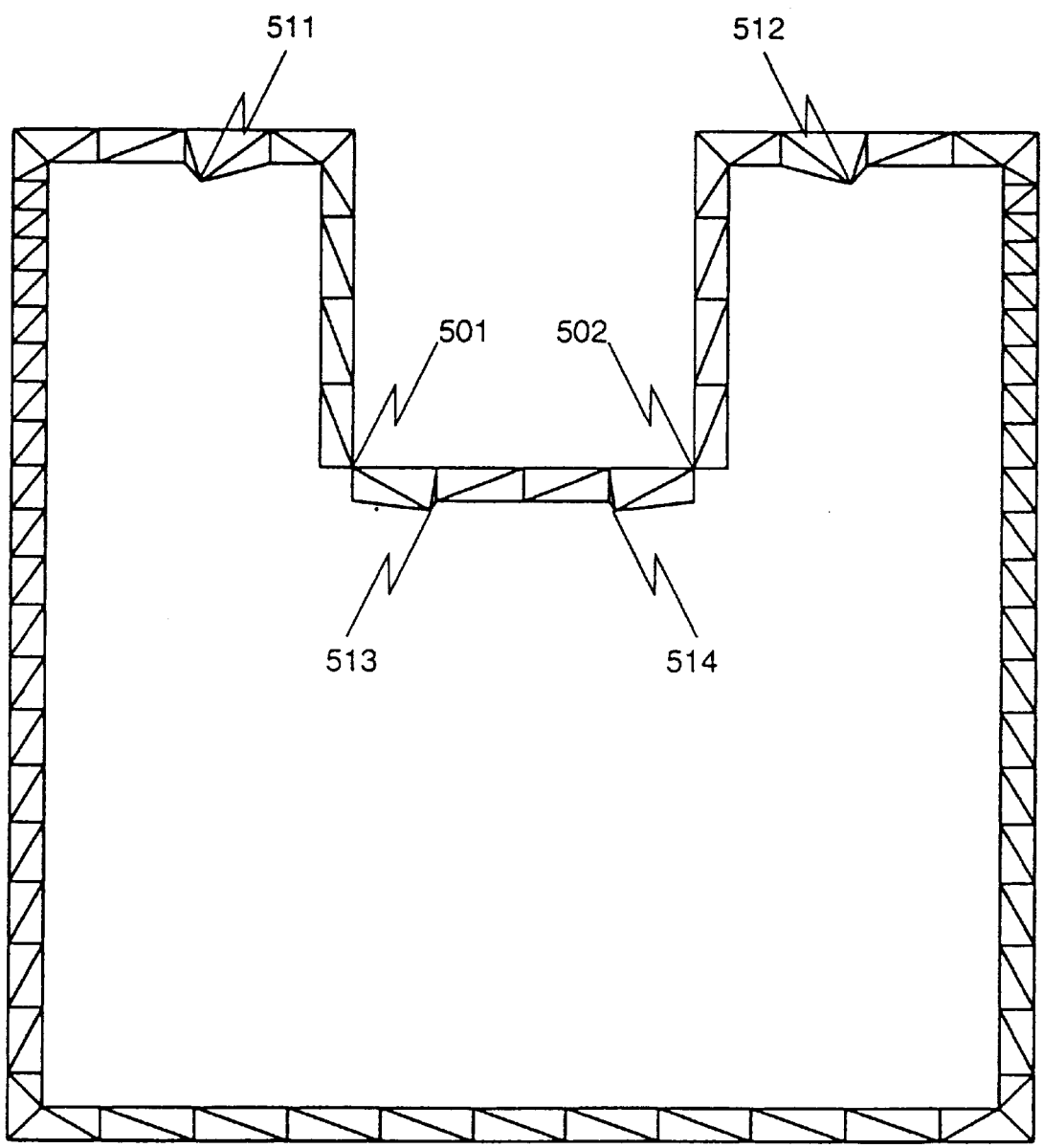
FIG. 8 is a diagram that represents the results of effecting triangular mesh generation limited to domains capable of destroying the boundary protection layer.

FIG. 8 diagrams an example wherein triangular meshes are deployed only in domains where there is a possibility of boundary protection layer destruction, using the present invention. The-triangular meshes having branches connected at 511, 512, 513, and 514 are destructive of the boundary protection layer because the boundary protection points and the mesh points inside the domain are joined together. Also, no meshes are generated at two locations, namely the mesh points 501 and 502, each of which is a sub-domain point, but, as was discussed earlier, at subdomain points, mesh points inside a domain destructive of the boundary protection layer are removed in processing step 102 in FIG. 1, wherefore nothing is affected by using this technique.

Figure 16:
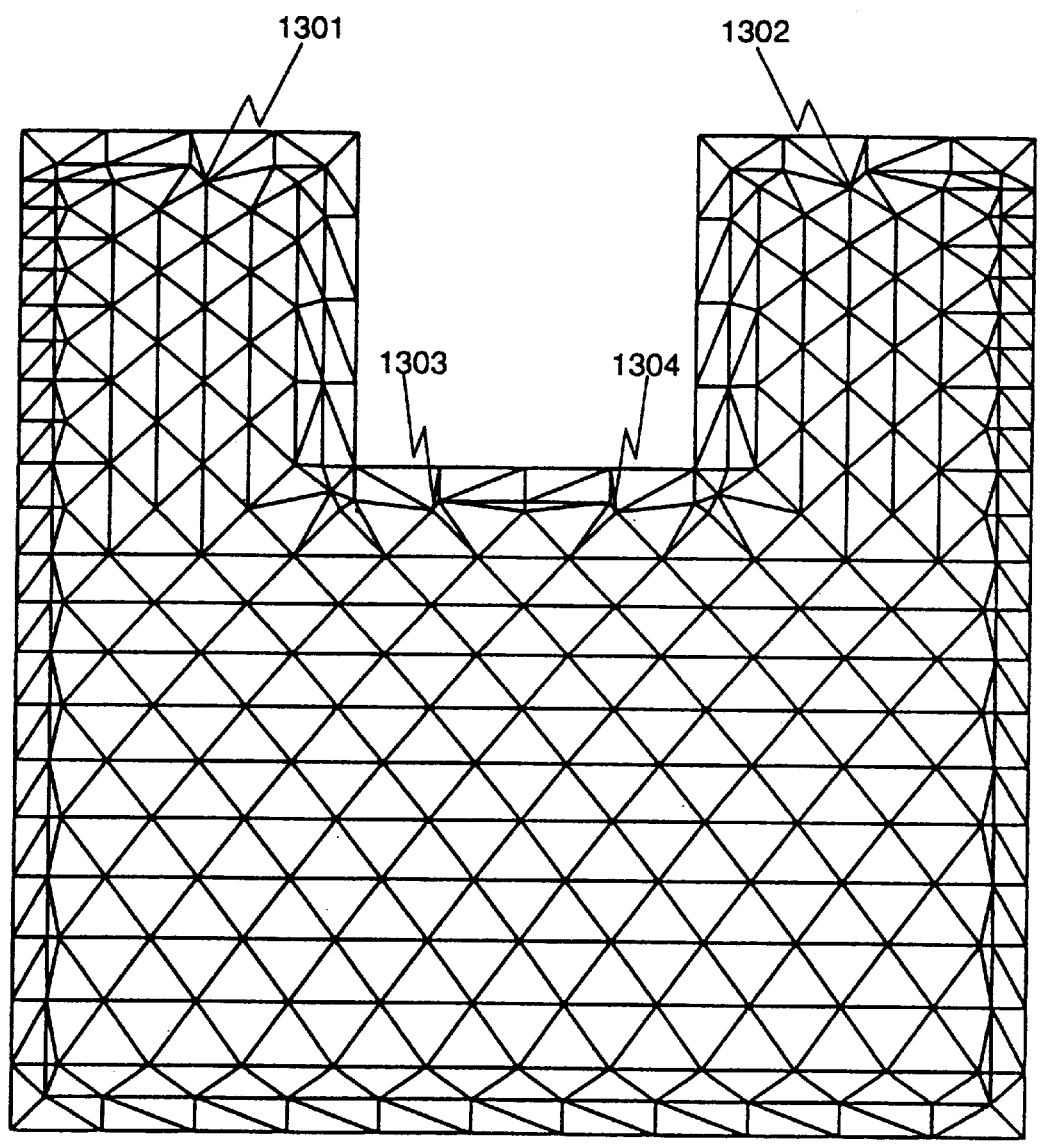
FIG. 16 is a diagram representing the results of generating the entire triangular mesh with the prior art.

Conventionally, as diagrammed in FIG. 16, triangular meshes were completed in the entire domain. Similarly as in FIG. 8, in the triangular meshes having branches joined at the mesh points 1301, 1302, 1303, and 1304, a boundary protection point and a mesh point inside the domain are connected, so the boundary protection layer is destroyed.

With the prior art, as in this example, when triangular meshes destructive of the boundary protection layer exist, time has to be wasted in the process of deploying triangular meshes for domains where there is no possibility of boundary protection layer destruction because triangular meshes are regenerated throughout the entire domain.

The present invention generates triangular meshes limited to domains wherein the boundary protection layer is destroyed, whereby it is possible to shorten the time wasted when triangular meshes exist that are destructive of the boundary protection layer.

Figure 9:
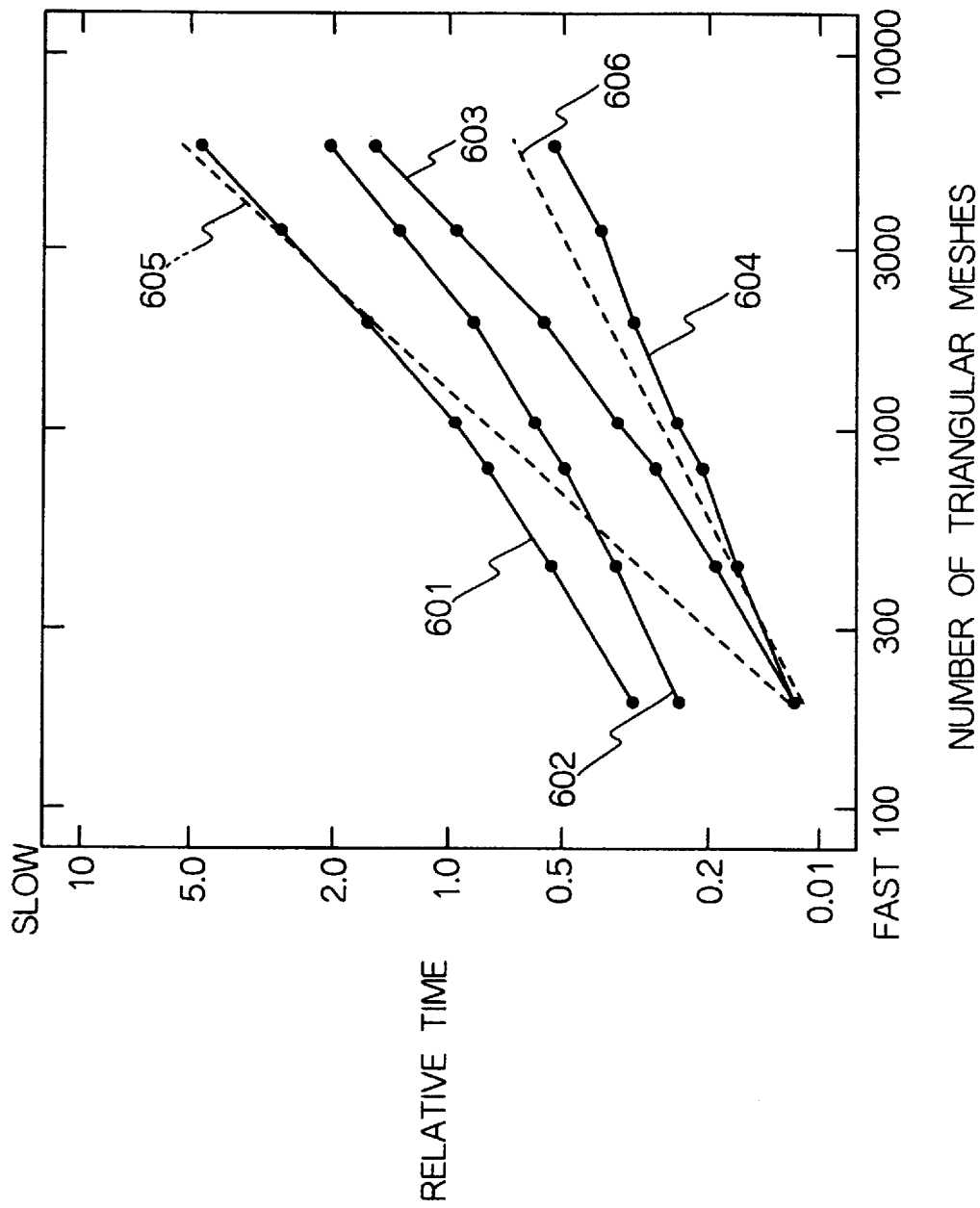
FIG. 9 is a graph of generation speed ratios for generating triangular meshes having a boundary protection layer in the present invention, taking the ratio of the prior art as 1.

FIG. 9 plots the mesh generation time when, under the same conditions, triangular meshes are generated having one boundary protection layer applied thereto. This is in a case where boundary protection layer destruction occurs two times, and the final number of triangular mesh generations is three.

As to the solid curves in FIG. 9, from the top, line segment 601 represents the prior art, while line segment 602 represents the present technique. Line segments 603 and 604, moreover, are components of the line segment 602. Line segment 603 represents the time required for generating a triangular mesh inside the domain, while line segment 604 represents the total time required for deploying meshes only in domains where there is a possibility of boundary protection layer destruction. The graph in this figure is normalized, moreover, by taking the time required to generate 1000 triangular meshes with the conventional generation method as a reference. The broken-line curves 605 and 606 represent slopes of order Nm and order √Nm, respectively, where Nm is the number of meshes.

With the conventional technique and the final interior-point mesh generation unit, the time required for generation roughly corresponds to the number of triangular meshes, wherefore the line segment slope approaches the slope of the broken-line curve 605. The processing time required for deploying meshes only in domains where the boundary protection layer is destroyed roughly coincides with the slope of the broken-line curve 606 because the number of triangular meshes actually generated $Nm_{new}$ is expressed as $Nm_{new} \sqrt{m}$.

As the number of triangular meshes increases, the final triangular mesh generation time, using the present invention technique, approaches the slope order √Nm because the processing for completing the triangular meshes inside the domain becomes heavier.

As may be seen from FIG. 9, as the number of triangular meshes increases, more time is required to generate mesh points inside the domain.

A characteristic of the present technique is that only the time indicated by the line segment 602 is needed for the difference between the line segments 605 and 603.

EMBODIMENT 4

A fourth embodiment of the present invention is described next, making reference to the drawings.

Figure 10:
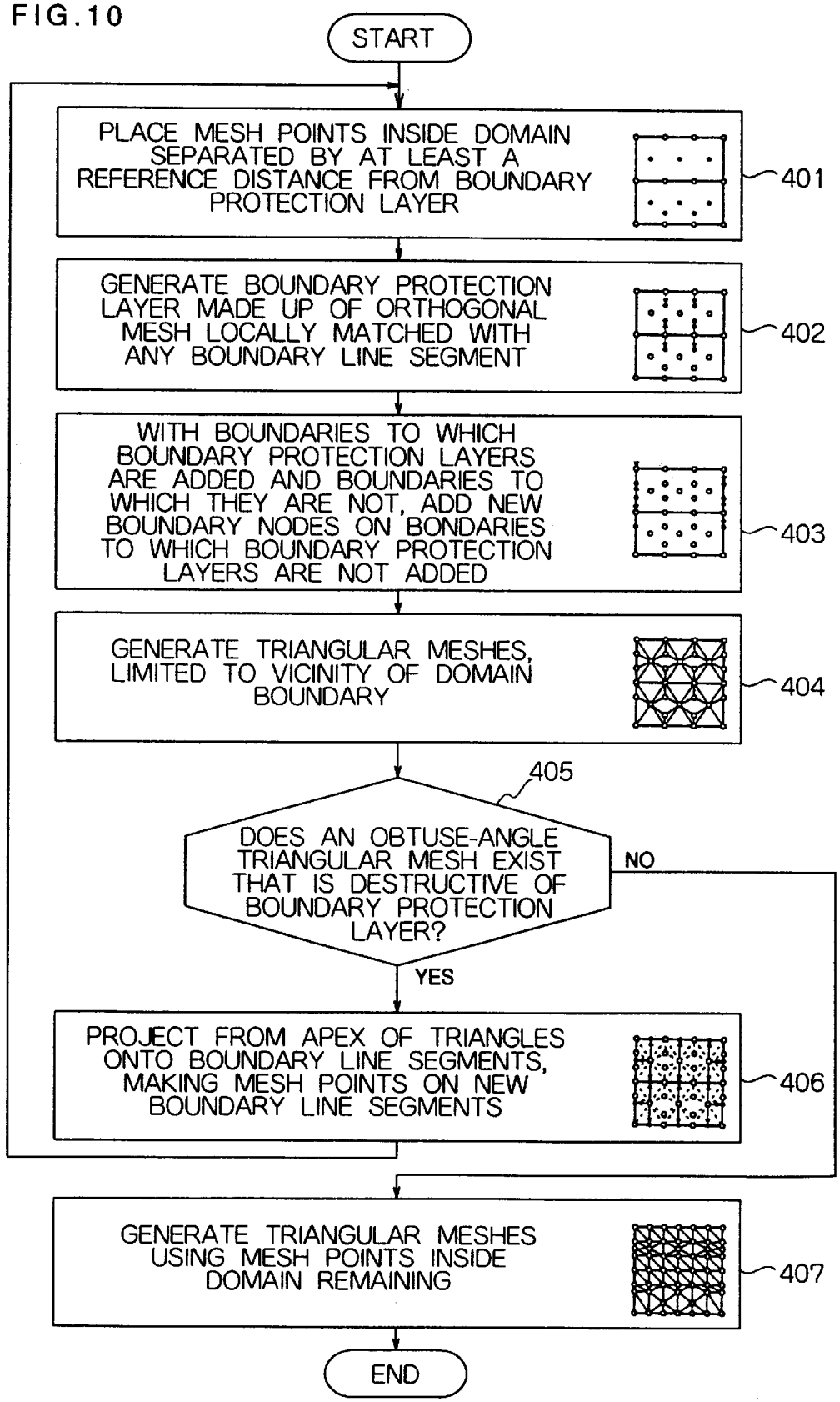
FIG. 10 is a flowchart representing a technique for generating boundary protection layers only at necessary boundaries in a fourth embodiment of the present invention.

A flowchart for this embodiment is given in FIG. 10. The main object of this embodiment is to prevent the generation of unnecessary meshes on device side surfaces and device bottom surfaces which require no boundary protection layer, because the boundary conditions are established, by causing boundaries for which a boundary protection layer is generated and boundaries for which no boundary protection layer is generated to coexist, and thereby speed up the process.

In processing step 401, mesh points are generated inside the domain.

In processing step 402, from boundaries requiring a boundary protection layer, boundary protection layers made up of orthogonal meshes locally matched to the interface shape are generated. At this time, no mesh points configuring a boundary protection layer are generated from an interface requiring no boundary protection layer to be generated, such as the device side surfaces and device bottom surfaces, at which boundary conditions are established.

Figure 11:
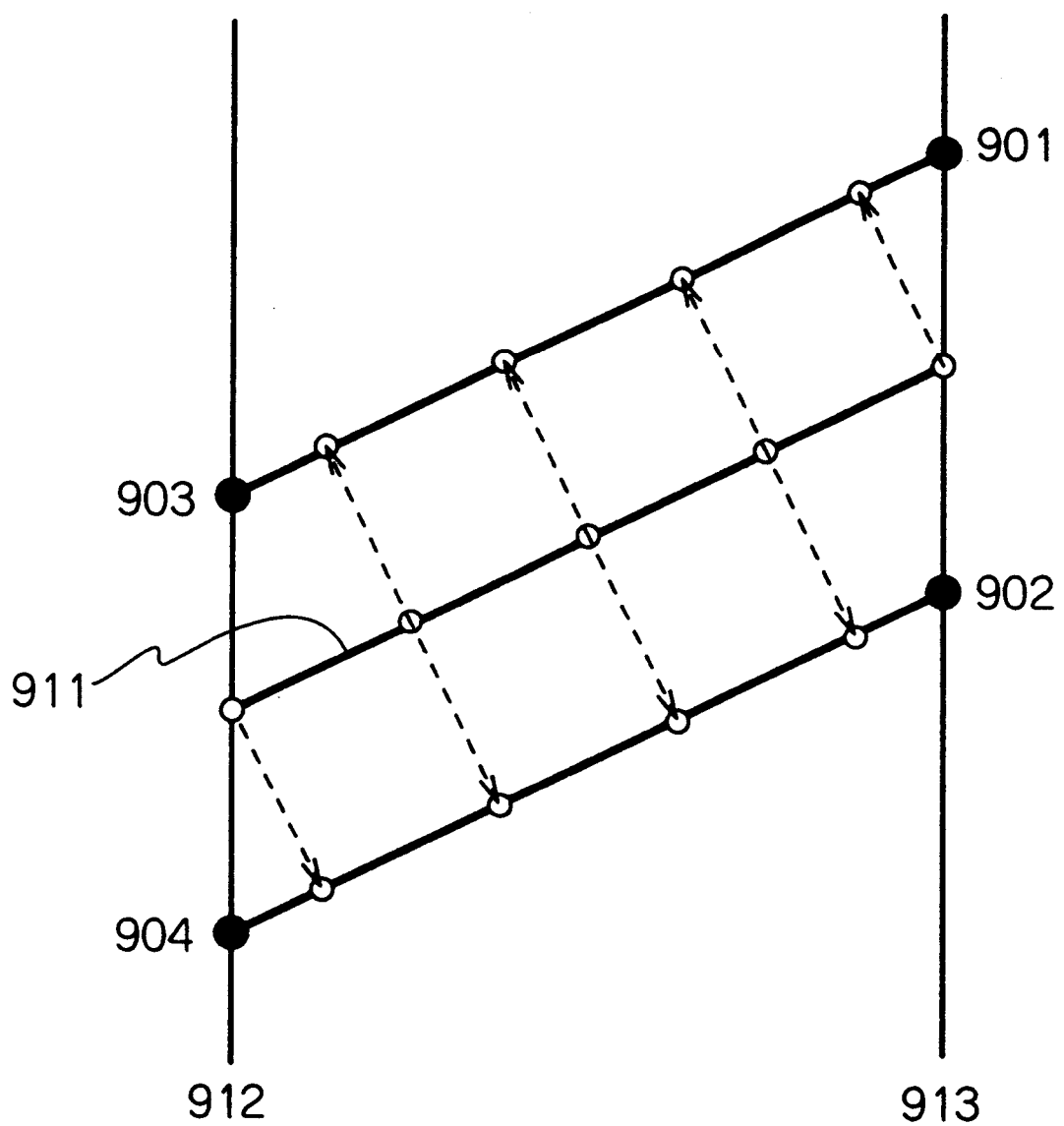
FIG. 11 is an explanatory diagram representing a processing procedure when an interface needing a boundary protection layer and an interface needing no boundary protection layer are in contact at an angle of less than 180 degrees, in the fourth embodiment.
Figure 12:
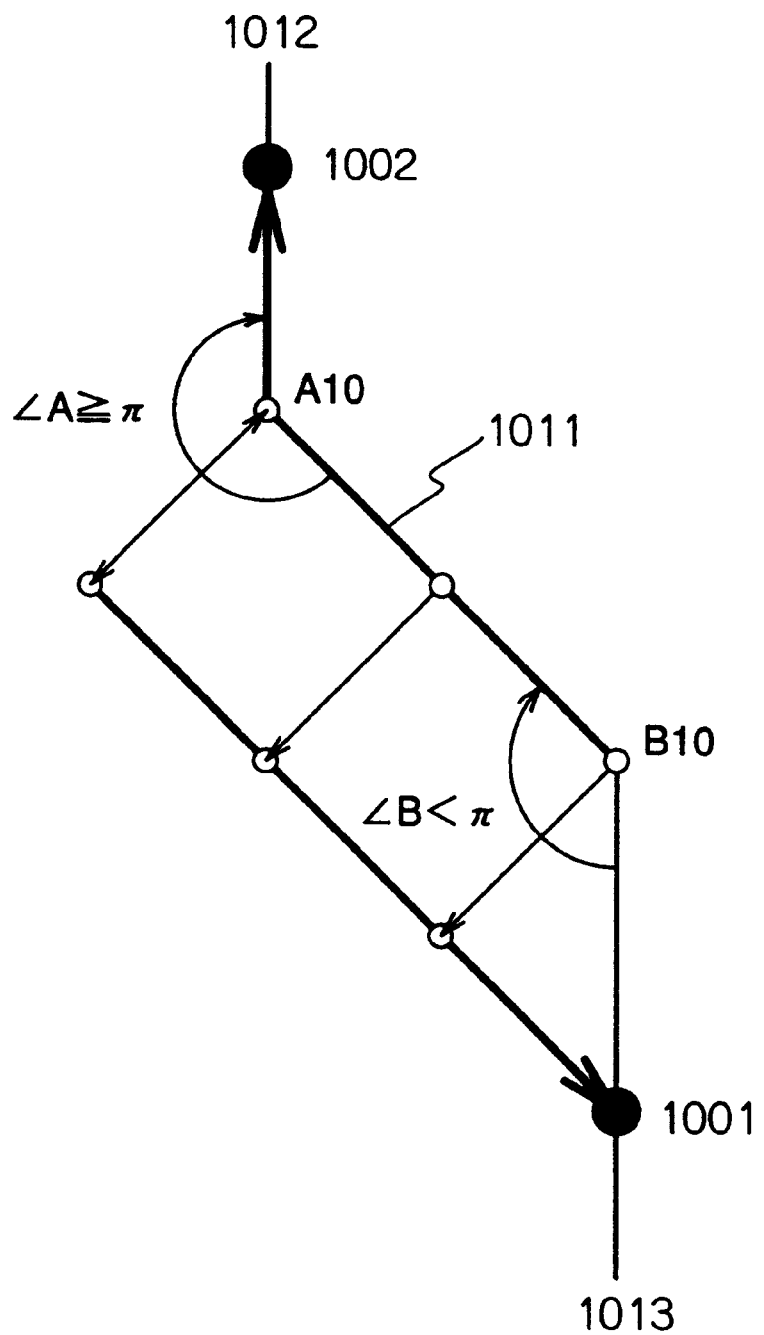
FIG. 12 is an explanatory diagram representing a processing procedure when an interface needing a boundary protection layer and an interface needing no boundary protection layer are in contact at an angle of 180 degrees or greater, in the fourth embodiment.

In processing step 403, processing is performed so as to avoid the destruction of boundary protection layer at the intersections of interfaces for which boundary protection layers are generated and interfaces requiring no boundary protection layer. As diagrammed in FIG. 11, when the angle subtended by a boundary protection layer interface and an interface requiring no boundary protection layer is less than 180 degrees, new mesh points are generated at the intersections with the boundary protection layers equal to the number of boundary protection layers. When that angle is 180 degrees or more, as diagrammed in FIG. 12, a new mesh point is generated at the position of the one boundary protection layer.

In processing step 404, using either the second or the third embodiment, meshes are generated, limited to domains wherein boundary protection layer is destroyed.

In processing step 405, verification is made of the presence or absence of an obtuse triangle wherewith a mesh destructive of boundary protection layer and a circumcenter fall outside the domain.

In processing step 406, when it has been determined in processing step 405 that boundary protection layer is being destroyed, a mesh point is newly generated at a position projected on the boundary line segment from the apex, and processing step 402 is returned to.

In processing step 407, when it has been determined in processing step 405, that boundary protection layer is not being destroyed, the triangular meshes are completed inside the domain and mesh generation is terminated.

Figure 13:
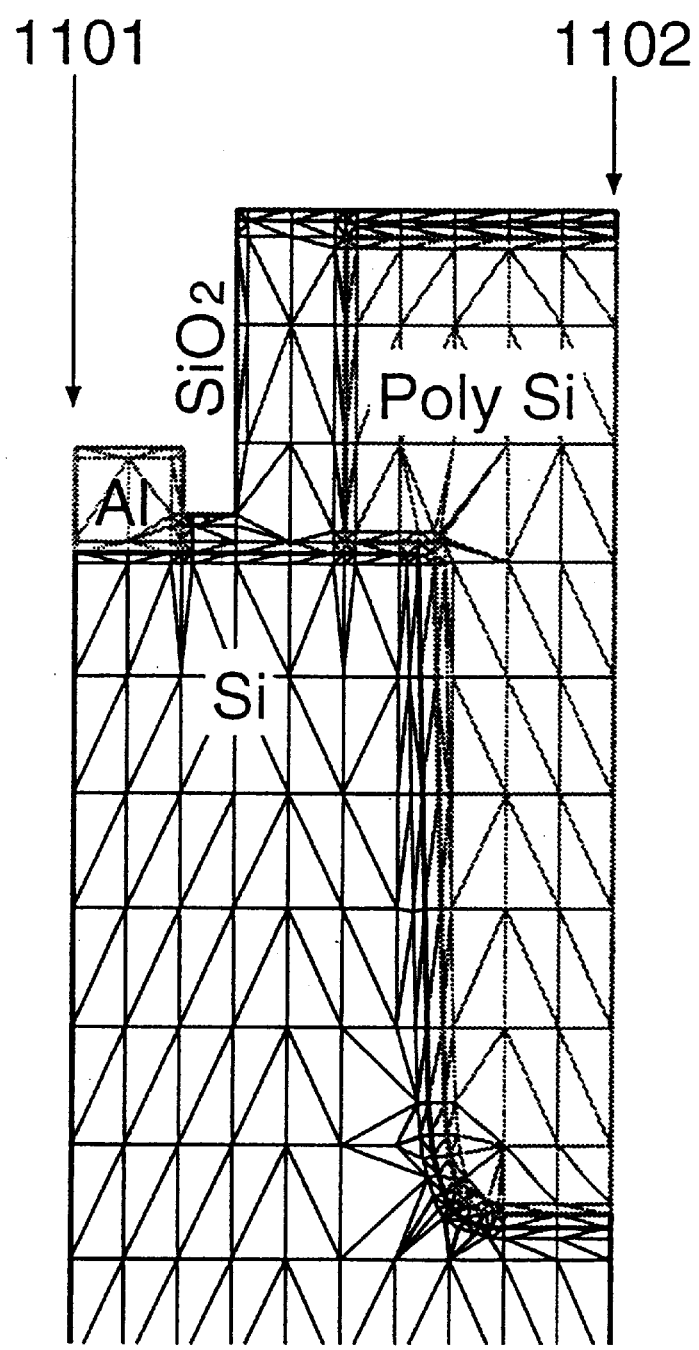
FIG. 13 is a diagram representing the shape of a mesh when sub-domain points are added, only at necessary interfaces, in a fourth embodiment.

In the shape of the mesh generated by the present technique, it is possible to have a device side surface for which no boundary protection layer is generated and a mass interface for which a boundary protection layer is necessary exist simultaneously, as diagrammed in FIG. 13. As a result, the total number of meshes can be reduced, required memory decreased, and simulation times shortened.

As is clear from the description given in the foregoing, the present invention differs from the conventional methodology, being characterized in that it comprises processing procedures limited to domains wherein boundary protection layer is destroyed, without generating triangular meshes throughout the entire domain, when searching for triangular meshes that destroy boundary protection layer, as becomes necessary when generating boundary protection layer. It is also characterized in that it comprises processing procedures for generating boundary protection layer not for all boundary line segments, but only for line segments requiring boundary protection layer.

In terms of the method of limiting the domains to those wherein boundary protection layer is destroyed, a technique is herein disclosed that is characterized in that triangular meshes are completed for all mesh points inside a boundary protection layer, using the branch activity degree. In terms of a faster variation of the technique noted above, a technique is herein disclosed that is characterized in that triangular meshes are generated until a triangular mesh containing no boundary protection point is generated, by producing mesh from the periphery of the domain toward the interior thereof, using the property whereby the boundary protection layer exists in the most peripheral area. A technique is also disclosed that is characterized in that mesh points are added so as not to destroy boundary protection layer, where there is a boundary to which a boundary protection layer is added and a boundary to which no boundary protection layer is added, in order to generate boundary protection layer only for boundaries requiring them.

Figure 17:
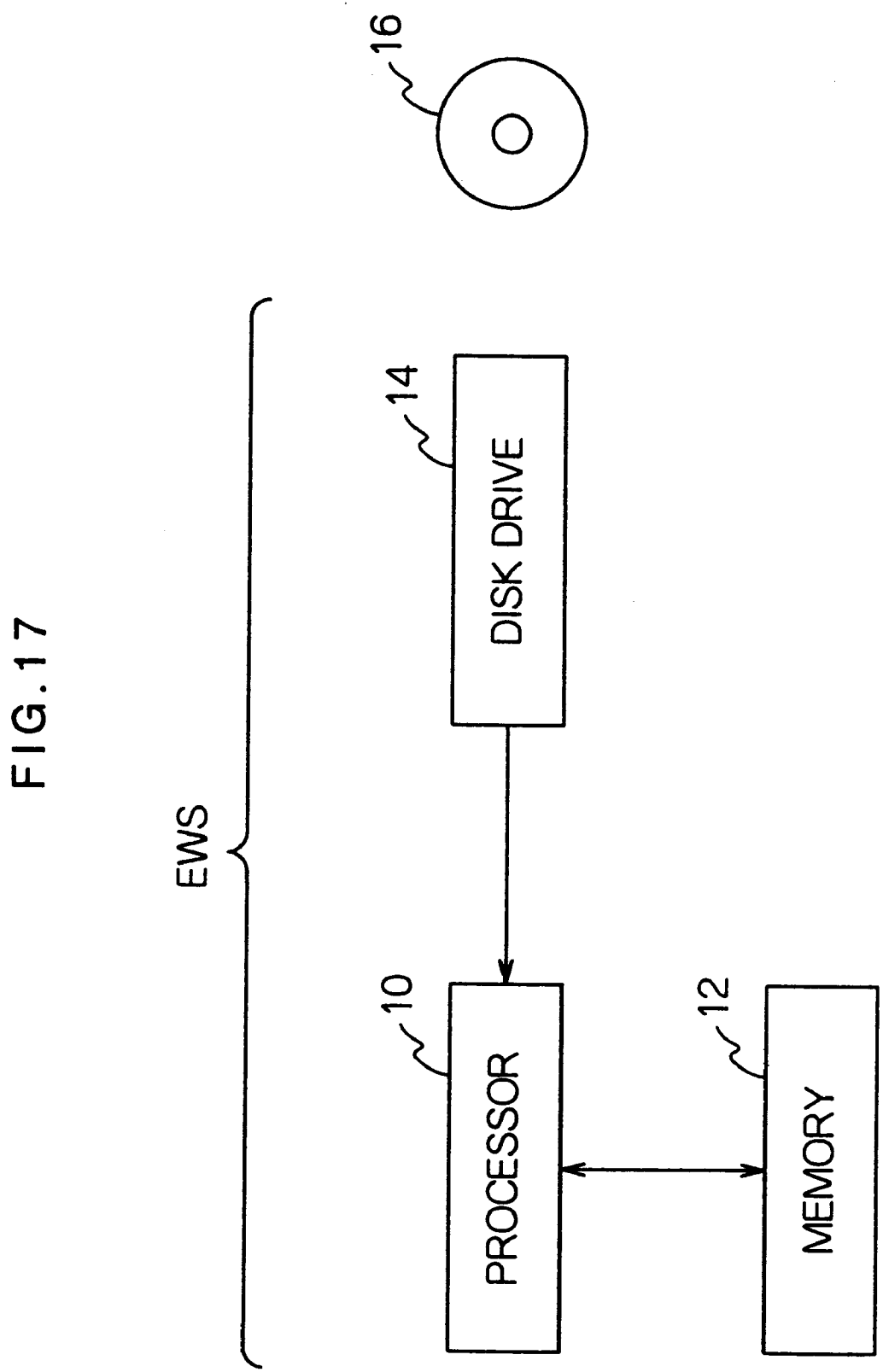
FIG. 17 is a block diagram representing a workstation for simulation mesh generation apparatus.

FIG. 17 is a block diagram of an example wherein the technique described in the foregoing is implemented in an engineering work station (EWS). The EWS comprises a processor 10 for executing data processing, a memory 12 for temporarily storing programs and data, and a disk drive for reading out data stored in a storage medium such as a CD-ROM. Connected to this EWS are such peripheral equipment as a keyboard, display monitor, hard disk drive, and network adapter, etc. In the example diagrammed in FIG. 17, a program is stored in the CD-ROM 16 for implementing the mesh generation method described above in the EWS. In these program files are contained a program wherein the processing routines represented in FIG. 1 are written in a prescribed programming language. When this program is executed by the EWS diagrammed in FIG. 17, the EWS becomes an apparatus for generating triangular meshes.

The original data for generating the triangular meshes may be CAD data defined with this EWS, or data received over a network or via a disk drive. The apparatus for generating these triangular meshes may output the triangular mesh data generated to an external device, or output those data to an analysis application inside the apparatus.

When the present invention is implemented, the generation of triangular meshes having boundary protection layers can be speeded up. When that is done, it is possible to shorten simulation times for simulations wherein triangular meshes are generated in large volume due to shape changes, as in oxidation processes.

The reason for this is that, when conducting searches for triangular meshes destructive of boundary protection layer, by limiting the generation of the triangular meshes to domains wherein the possibility of boundary protection layer destruction exists, the volume of triangular mesh generation is reduced, and the time required for triangular mesh generation shortened, whereby the time required to generate the triangular meshes with boundary protection layers is also shortened.

By generating boundary protection layers only at interfaces requiring boundary protection layers, moreover, the number of meshes in the boundary protection layer can be reduced, and thus the time required for generating triangular meshes with boundary protection layers can also be reduced. At the same time, any increase in the total number of meshes is suppressed, wherefore the time required for diffusion or other simulation after mesh generation is also shortened.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 9-198640 (Filed on Jul. 24th, 1997) including specification, claims, drawings and summary are incorporated herein by reference in its entirety.

Explanations are first given for some of the representative reference characters in the drawings.

501, 502 Shape characterizing points that do not generate triangular meshes

511, 512, 513, 514 Triangular meshes that destroy boundary protection layer

601 Mesh generation time using conventional boundary protection layer generation routine

602 Mesh generation time using the present invention

603 Time required for completing triangular meshes inside domains in the present invention

604 Time necessary for deploying triangular meshes only in those domains capable of destroying boundary protection layer in this invention

605 Line segment indicating slope of order Nm

606 Line segment indicating slope of order Nm

P7, Q7, R7 Mass boundary line segment shaped mesh points (Q7 being a sub-domain point)

A7, B7 boundary protection point generated from sub-domain point Q7

C7 Mesh point inside domain existing inside circle circumscribed about triangle A7 Q7 B7

O71 Circle indicating domain where only boundary protection points can exist

O72 Circle circumscribed about triangle A7 Q7 B7

P8, Q8, R8 Mass boundary line segment shaped mesh points (Q8 being a sub-domain point)

A8, B8, C8, D8 Boundary protection point generated from sub-domain point Q7

E8 Mesh points inside domain existing inside circle circumscribed about parallelogram A8 B8 C8 D8

O81 Circle indicating domain wherein only boundary protection points can exist

O82 Circle circumscribed about parallelogram A8 B8 C8 D8

901, 902, 903, 904 Mesh points newly added to interface where no boundary protection layer is deployed

911 Interface requiring a boundary protection layer p1

912, 913 Interfaces requiring no boundary protection layer

A10 Angle subtended by an interface requiring a boundary protection layer and an interface not requiring a boundary protection layer, equal to or greater than $\pi$

B10 Angle subtended by an interface requiring a boundary protection layer and an interface not requiring a boundary protection layer, less than $\pi$

1001 Mesh point newly added when angle subtended with interface wherein no boundary protection layer is deployed is less than $\pi$

1002 Mesh point newly added when angle subtended with interface wherein no boundary protection layer is deployed is equal to or greater than $\pi$

1101, 1102 Interfaces requiring no boundary protection layer

1301, 1302, 1303, 1304 Triangular meshes that destroy boundary protection layers

A14, B14 Active branch terminal mesh points (triangular meshes are generated from these branchs)

C14, D14, E14, F14 Mesh points that become candidates for generating triangular meshes

What is claimed is:

1. A method for generating, with a computer, meshes used in simulations such as semiconductor process and device simulations, comprising the steps of:
   a. receiving device shape data;
   b. generating, as boundary protection points, a first set of mesh points from a plurality of mesh points that define a boundary protection layer comprising orthogonal meshes matched locally with boundary line segments;
   c. placing a second set of mesh points from said plurality of mesh points inside domains separated by at least a reference distance from said boundary protection layer;
   d. specifying, from among said domains, destructive domains as those domains wherein there is a possibility of boundary protection layer destruction, and joining mesh points that are inside said destructive domains to create triangular meshes;
   e. determining, from among said triangular meshes, the presence or absence of any such triangular meshes destructive of said boundary protection layer, by whether or not there are branches, in a side or sides of said triangular meshes, that join said boundary protection points and a mesh point inside said destructive domains;
   f. when there exist triangular meshes destructive of said boundary protection layer, projecting said mesh point inside said destructive domains onto said boundary line segments, and adding the projection point as a mesh point on a newly created boundary;
   g. joining unjoined mesh points when triangular meshes no longer exist that are destructive of said boundary protection layer; and
   h. outputting triangular mesh data.

2. The method according to claim 1, wherein, in said step d, destructive domains are defined by boundary protection points inside a boundary protection layer and mesh points placed one level farther inside from these boundary protection points.

3. The method according to claim 1, wherein, in said step d, only triangular meshes containing at least one boundary protection point are generated by Delaunay division.

4. The method according to claim 1, wherein, in said step d, only triangular meshes containing at least one boundary protection point are generated using the method of maximizing the apparent angle.

5. The method according to claim 4, wherein, in said step d, mesh points are searched for in triangular meshes containing at least one boundary protection point, wherein said mesh points are circumscribed by circles, and a circle defined by three of said mesh points becomes the smallest circle of said circles.

6. The method according to claim 1, wherein, in said step c, from among said boundary protection points, mesh points destructive of the boundary protection layer are removed beforehand at sub-domain points constituting characteristics of said device.

7. The method according to claim 6, wherein, in said step c, mesh points existing inside circles circumscribed about triangular meshes containing sub-domain points constituting characteristics of said device are removed.

8. The method according to claim 1, wherein, in said step f, steps b to e are re-executed with mesh points at added projection points.

9. The method according to claim 1, wherein step d further comprises the steps of:
   d11. turning on a flag indicating that a branch is active, being able to produce a triangular mesh, and setting an activity degree counter indicating how many active branches a branch terminal mesh point currently possesses;
   d12. generating said triangular mesh from said active branches, using the method of maximizing the apparent angle;
   d13. determining whether or not said boundary protection points are contained in the three apexes of the triangular mesh obtained in step d12;
   d14. updating activity degree of each branch of said triangular mesh and said mesh point activity degree counters, when said boundary protection points are contained within said three apexes of said triangular mesh, and registering the triangular mesh generated;
   d15. determining whether or not said activity degree counter for said boundary protection points has become 0 at all said boundary protection points, when said boundary protection points are not contained within said three apexes of said triangular mesh;
   d16. terminating generation of triangular meshes inside domains where there is a possibility of destruction of said boundary protection layer, when all said activity degree counters are 0; and
   d17. repeating processing in said steps d12 to d15 when a boundary protection point exists for which said activity degree counter is not 0.

10. The method according to claim 1, wherein step d further comprises the steps of:
    d21. deeming active, a branch between mesh points on a boundary line configuring a boundary line segment, and setting a line segment terminal mesh point activity degree counter;
    d22. generating a triangular mesh from said active branch, using the method of maximizing the apparent angle;
    d23. determining whether or not said boundary protection point is contained in three apexes of said triangular mesh obtained in step d22, and terminating generation of all triangular meshes capable of destroying said boundary protection layer when said boundary protection point is contained in said three apexes of said triangular mesh; and
    d24. updating activity degree of each branch for said triangular mesh and said activity degree counter when, in step d23, said boundary protection point is contained in said three apexes of said triangular mesh, registering the triangular mesh generated, and jumping the processing to step d22; wherein step d23 repeats the processing containing steps d22 to d24 until a mesh is generated containing no said boundary protection point at all.

11. A computer system for generating meshes used in simulations such as semiconductor process and device simulations, comprising:
    a processor; and
    a memory including software instructions which, when executed, enable the computer system to perform the steps of:
    a. receiving device shape data;
    b. generating, as boundary protection points, a first set of mesh points from a plurality of mesh points that define a boundary protection layer comprising orthogonal meshes matched locally with boundary line segments;
    c. placing a second set of mesh points from said plurality of mesh points inside domains separated by at least a reference distance from said boundary protection layer;

d. specifying, from among said domains, destructive domains as those domains wherein there is a possibility of boundary protection layer destruction, and joining mesh points that are inside said destructive domains to create triangular meshes;

e. determining, from among said triangular meshes, the presence or absence of any such triangular meshes destructive of said boundary protection layer, by whether or not there are branches, in a side or sides of said triangular meshes, that join said boundary protection points and a mesh point inside said destructive domains;

f. when there exist triangular meshes destructive of said boundary protection layer, projecting said mesh point inside said destructive domains onto said boundary line segments, and addinig the projection point as a mesh point on a newly created boundary;

g. joining unjoined mesh points when triangular meshes no longer exist that are destructive of said boundary protection layer; and h. outputting triangular mesh data.

12. The computer system according to claim 11, wherein for step d, said software instructions, further enable the computer system to perform the steps of:

d11. turning on a flag indicating that a branch is active, being able to produce a triangular mesh, and setting an activity degree counter indicating how many active branches a branch terminal mesh point currently possesses;

d12. generating said triangular mesh from said active branches, using the method of maximizing the apparent angle;

d13. determining whether or not said boundary protection points are contained in the three apexes of the triangular mesh obtained in step d12;

d14. updating activity degree of each branch of said triangular mesh and said mesh point activity degree counters, when said boundary protection points are contained within said three apexes of said triangular mesh, and registering the triangular mesh generated;

d15. determining whether or not said activity degree counter for said boundary protection points has become 0 at all said boundary protection points, when said boundary protection points are not contained within said three apexes of said triangular mesh;

d16. terminating generation of triangular meshes inside domains where there is a possibility of destruction of said boundary protection layer, when all said activity degree counters are 0; and d17. repeating processing in said steps d12 to d15 when a boundary protection point exists for which said activity degree counter is not 0.

13. The computer system according to claim 11, wherein for step d, said software instructions, further enable the computer system to perform the steps of:

d21. deeming active, a branch between mesh points on a boundary line configuring a boundary line segment, and setting a line segment terminal mesh point activity degree counter;

d22. generating a triangular mesh from said active branch, using the method of maximizing the apparent angle;

d23. determining whether or not said boundary protection point is contained in three apexes of said triangular mesh obtained in step d22, and terminating generation of all triangular meshes capable of destroying said boundary protection layer when said boundary protection point is contained in said three apexes of said triangular mesh; and d24. updating activity degree of each branch for said triangular mesh and said activity degree counter when, in step d23, said boundary protection point is contained in said three apexes of said triangular mesh, registering the triangular mesh generated, and jumping the processing to step d22; wherein step d23 repeats the processing containing steps d22 to d24 until a mesh is generated containing no said boundary protection point at all.

14. A computer system for generating meshes used in simulations such as semiconductor process and device simulations, comprising:

a. means for receiving device shape data;

b. means for generating, as boundary protection points, a first set of mesh points from a plurality of mesh points that define a boundary protection layer comprising orthogonal meshes matched locally with boundary line segments;

c. means for placing a second set of mesh points from said plurality of mesh points inside domains separated by at least a reference distance from said boundary protection layer;

d. means for specifying, from among said domains, destructive domains as those domains wherein there is a possibility of boundary protection layer destruction, and joining mesh points that are inside said destructive domains to create triangular meshes;

e. means for determining, from among said triangular meshes, the presence or absence of any such triangular meshes destructive of said boundary protection layer, by whether or not there are branches, in a side or sides of said triangular meshes, that join said boundary protection points and a mesh point inside said destructive domains;

f. means for projecting, when there exist triangular meshes destructive of said boundary protection layer, aid mesh point inside said destructive domains onto said boundary line segments, and for adding the projection point as a mesh point on a newly created boundary;

g. means for joining unjoined mesh points when triangular meshes no longer exist that are destructive of said boundary protection layer; and h. means for outputting triangular mesh data.

15. A computer readable medium on which is stored a computer program for generating meshes used in simulations such as semiconductor process and device simulations, said computer program storing instructions which, when executed, will perform the steps of:

a. receiving device shape data;

b. generating, as boundary protection points, a first set of mesh points from a plurality of mesh points that define a boundary protection layer comprising orthogonal meshes matched locally with boundary line segments;

c. placing a second set of mesh points from said plurality of mesh points inside domains separated by at least a reference distance from said boundary protection layer;

d. specifying, from among aid domains, destructive domains as those domains wherein there is a possibility of boundary protection layer destruction, and joining mesh points that are inside said destructive domains to create triangular meshes;

e. determining, from among said triangular meshes, the presence or absence of any such triangular meshes destructive of said boundary protection layer, by whether or not there are branches, in a side or sides of said triangular meshes, that join said boundary protection points and a mesh point inside said destructive domains;

f. when there exist triangular meshes destructive of said boundary protection layer, projecting said mesh point inside said destructive domains onto said boundary line segments, and adding the projection point as a mesh point on a newly created boundary;

g. joining unjoined mesh points when triangular meshes no longer exist that are destructive of said boundary protection layer; and h. outputting triangular mesh data.

16. The computer readable medium according to claim 15, wherein for step d, said computer program further performs the steps of:

d11. turning on a flag indicating that a branch is active, being able to produce a triangular mesh, and setting an activity degree counter indicating how many active branches a branch terminal mesh point currently possesses;

d12. generating said triangular mesh from said active branches, using the method of maximizing the apparent angle;

d13. determining whether or not said boundary protection points are contained in the three apexes of the triangular mesh obtained in step d12;

d14. updating activity degree of each branch of said triangular mesh and said mesh point activity degree counters, when said boundary protection points are contained within said three apexes of said triangular mesh, and registering the triangular mesh generated;

d15. determining whether or not said activity degree counter for said boundary protection points has become 0 at all said boundary protection points, when said boundary protection points are not contained within said three apexes of said triangular mesh;

d16. terminating generation of triangular meshes inside domains where there is a possibility of destruction of said boundary protection layer, when all said activity degree counters are 0; and d17. repeating processing in said steps d12 to d15 when a boundary protection point exists for which said activity degree counter is not 0.

17. The computer readable medium according to claim 15, wherein for step d, said computer program further performs the steps of:

d21. deeming active, a branch between mesh points on a boundary line configuring a boundary line segment, and setting a line segment terminal mesh point activity degree counter;

d22. generating a triangular mesh from said active branch, using the method of maximizing the apparent angle;

d23. determining whether or not said boundary protection point is contained in three apexes of said triangular mesh obtained in step d22, and terminating generation of all triangular meshes capable of destroying said boundary protection layer when said boundary protection point is contained in said three apexes of said triangular mesh; and d24. updating activity degree of each branch for said triangular mesh and said activity degree counter when, in step d23, said boundary protection point is contained in said three apexes of said triangular mesh, registering the triangular mesh generated, and jumping the processing to step d22; wherein step d23 repeats the processing containing steps d22 to d24 until a mesh is generated containing no said boundary protection point at all.

18. A method for generating, with a computer, meshes used in simulations such as semiconductor process and device simulations, comprising the steps of:

a. receiving device shape data;

b. generating, as boundary protection points, a first set of mesh points from a plurality of mesh points that define a boundary protection layer comprising orthogonal meshes matched locally with boundary line segments;

c. placing a second set of mesh points from said plurality of mesh points inside domains separated by at least a reference distance from said boundary protection layer;

d. specifying, from among said domains, destructive domains as those domains wherein there is a possibility of boundary protection layer destruction, and joining mesh points that are inside said destructive domains to create triangular meshes;

e. determining, from among said triangular meshes, the presence or absence of any such triangular meshes destructive of said boundary protection layer, by whether or not there are branches, in a side or sides of said triangular meshes, that join said boundary protection points and a mesh point inside said destructive domains;

f. when there exist triangular meshes destructive of said boundary protection layer, projecting said mesh point inside said destructive domains onto said boundary line segments, and adding the projection point as a mesh point on a newly created boundary;

g. joining unjoined mesh points when triangular meshes no longer exist that are destructive of said boundary protection layer; and h. outputting triangular mesh data, wherein step b further comprises the steps of:

b31. reading positions of boundary line segments, and such properties thereof;

b32. determining whether or not to add boundary protection layers to said boundary line segments according to the properties of said boundary line segments; and b33. adding new mesh points at intersections occurring between interfaces of said boundary protection layers when said boundary protection layers are extended, and said boundary line segments requiring no boundary protection layers, for angles subtended by boundary line segments requiring said boundary protection layers and boundary line segments not requiring said boundary protection layers; wherein:

in step b32, said boundary protection layers are not generated for all of said boundary line segments, but said boundary protection layers are generated only for said boundary line segments requiring said boundary protection layers.

19. The method according to claim 18, wherein, in said step d, destructive domains are defined by boundary protection points inside a boundary protection layer and mesh points placed one level farther inside from these boundary protection points.

20. The method according to claim 18, wherein, in said step d, only triangular meshes containing at least one boundary protection point are generated by Delaunay division.

21. The method according to claim 18, wherein, in said step d, only triangular meshes containing at least one boundary protection point are generated using the method of maximizing the apparent angle.

22. The method according to claim 21, wherein, in said step d, mesh points are searched for in triangular meshes containing at least one boundary protection point, wherein said mesh points are circumscribed by circles, and a circle defined by three of said mesh points becomes the smallest circle of said circles.

23. The method according to claim 18, wherein, in said step c, from among said boundary protection points, mesh points destructive of the boundary protection layer are removed beforehand at sub-domain points constituting characteristics of said device.

24. The method according to claim 23, wherein, in said step c, mesh points existing inside circles circumscribed about triangular meshes containing sub-domain points constituting characteristics of said device are removed.

25. The method according to claim 18, wherein, in said step f, steps b to e are re-executed with mesh points at added projection points.

26. A computer system for generating meshes used in simulations such as semiconductor process and device simulations, comprising:
   a. means for receiving device shape data;
   b. means for generating, as boundary protection points, a first set of mesh points from a plurality of mesh points that define a boundary protection layer comprising orthogonal meshes matched locally with boundary line segments;
   c. means for placing a second set of mesh points from said plurality of mesh points inside domains separated by at least a reference distance from said boundary protection layer;
   d. means for specifying, from among said domains, destructive domains as those domains wherein there is a possibility of boundary protection layer destruction, and joining mesh points that are inside said destructive domains to create triangular meshes;
   e. means for determining, from among said triangular meshes, the presence or absence of any such triangular meshes destructive of said boundary protection layer, by whether or not there are branches, in a side or sides of said triangular meshes, that join said boundary protection points and a mesh point inside said destructive domains;
   f. means for projecting, when there exist triangular meshes destructive of said boundary protection layer, said mesh point inside said destructive domains onto said boundary line segments, and for adding the projection point as a mesh point on a newly created boundary;
   g. means for joining unjoined mesh points when triangular meshes no longer exist that are destructive of said boundary protection layer; and
   h. means for outputting triangular mesh data wherein said means for generating said boundary protection points further comprise:
      b31. means for reading positions of boundary line segments, and such properties thereof;
      b32. means for determining whether or not to add boundary protection layers to said boundary line segments according to the properties of said boundary line segments; and
      b33. means for adding new mesh points at intersections occurring between interfaces of said boundary protection layers when said boundary protection layers are extended, and said boundary line segments requiring no boundary protection layers, for angles subtended by boundary line segments requiring said boundary protection layers and boundary line segments not requiring said boundary protection layers; wherein:
   said means b32, do not generate said boundary protection layers for all of said boundary line segments, but generate said boundary protection layers only for said boundary line segments requiring said boundary protection layers.

* * * * *

UNITED STATES PATENT AND TRADEMARK OFFICE
CERTIFICATE OF CORRECTION

PATENT NO. : 6,178,544 B1
DATED : January 23, 2001
INVENTOR(S) : Toshiyuki Syo

It is certified that error appears in the above-identified patent and that said Letters Patent is hereby corrected as shown below:

Column 1,
Line 31, delete "triangular.meshes" insert -- triangular meshes --

Column 3,
Line 30, after "projecting" insert -- a --;
Line 32, after "as" insert -- a --

Column 6,
Line 1, delete "-QB-" insert -- Q8 --

Column 7,
Line 10, delete "exists" insert -- insert --

Column 15,
Line 18, delete "addinig" insert -- adding --

Column 16,
Line 43, delete "aid" insert -- said --;
Line 65, delete "aid" insert -- said --

Signed and Sealed this

Thirteenth Day of November, 2001

*Attest:*

NICHOLAS P. GODICI
*Attesting Officer*   Acting Director of the United States Patent and Trademark Office